US008228175B1

(12) United States Patent
Diorio et al.

(10) Patent No.: US 8,228,175 B1
(45) Date of Patent: Jul. 24, 2012

(54) RFID TAG CHIPS AND TAGS WITH ALTERNATIVE BEHAVIORS AND METHODS

(75) Inventors: Christopher J. Diorio, Shoreline, WA (US); Theron Stanford, Seattle, WA (US); Scott A. Cooper, Seattle, WA (US); Chad A. Lindhorst, Seattle, WA (US); Kambiz Rahimi, Bellevue, WA (US); Harley K. Heinrich, Snohomish, WA (US); Gregory T. Kavounas, Kirkland, WA (US)

(73) Assignee: Impinj, Inc., Seattle, WA (US)

( * ) Notice: Subject to any disclaimer, the term of this patent is extended or adjusted under 35 U.S.C. 154(b) by 800 days.

(21) Appl. No.: 12/404,934

(22) Filed: Mar. 16, 2009

Related U.S. Application Data

(60) Provisional application No. 61/043,049, filed on Apr. 7, 2008, provisional application No. 61/047,653, filed on Apr. 24, 2008, provisional application No. 61/053,331, filed on May 15, 2008, provisional application No. 61/090,381, filed on Aug. 20, 2008, provisional application No. 61/101,047, filed on Sep. 29, 2008.

(51) Int. Cl.
*H04Q 5/22* (2006.01)
(52) U.S. Cl. .............. 340/10.51; 340/10.1; 340/10.2; 340/10.3; 340/10.31; 340/10.32; 340/10.34; 340/10.4; 340/10.41; 340/10.42; 340/10.5; 340/10.52; 340/10.6; 340/572.1; 340/572.2; 340/572.3; 340/572.4; 340/572.5; 340/572.6; 340/572.7; 340/572.8; 340/572.9; 235/375; 235/376; 235/377; 235/378; 235/379; 235/380; 235/381; 235/382; 235/382.5; 235/383; 235/384; 235/385
(58) Field of Classification Search ........ 340/10.1–10.6, 340/572.1–572.9; 235/375–385
See application file for complete search history.

(56) References Cited

U.S. PATENT DOCUMENTS

| 2,986,652 | A | | 5/1961 | Eachus | |
|---|---|---|---|---|---|
| 3,479,529 | A | | 11/1969 | Dine | |
| 3,551,705 | A | | 12/1970 | Juliusburger | |
| 4,032,838 | A | | 6/1977 | Minami et al. | |
| 4,506,329 | A | * | 3/1985 | Duwel et al. | 705/410 |
| 5,175,837 | A | * | 12/1992 | Arnold et al. | 711/152 |
| 5,394,367 | A | * | 2/1995 | Downs et al. | 365/195 |
| 5,467,081 | A | * | 11/1995 | Drews et al. | 340/5.22 |
| 5,513,136 | A | * | 4/1996 | Fandrich et al. | 365/185.04 |
| 5,535,164 | A | | 7/1996 | Adams et al. | |

(Continued)

OTHER PUBLICATIONS

A) EPCglobal, Inc. "Specification for RFID Air Interface-EPC Radio-Frequency Identity Protocols Class-1 Generation-2 UHF RFID Protocol for Communications at 860 MHz-960 MHz, Version 1.1.0." (a.k.a. "The Gen 2 Spec".) EPCglobal Inc., Dec. 17, 2005. http://www.epcglobalinc.org.

(Continued)

*Primary Examiner* — George Bugg
*Assistant Examiner* — Paul Obiniyi
(74) *Attorney, Agent, or Firm* — Turk IP Law, LLC

(57) ABSTRACT

RFID tags, ICs for RFID tags, and methods are provided. In some embodiments, an RFID tag includes a memory with multiple sections, and a processing block. The processing block may map one of these sections, or another of these sections, for purposes of responding to a first command from an RFID reader. As such, an RFID tag can operate according to the data stored in the section mapped at the time. In some embodiments, a tag can even transition from mapping one of the sections to mapping another of the sections. This can amount to the tag exhibiting alternative behaviors, and permits hiding data on the tag.

37 Claims, 25 Drawing Sheets

U.S. PATENT DOCUMENTS

| | | | |
|---|---|---|---|
| 5,606,323 A | | 2/1997 | Heinrich et al. |
| 5,630,216 A | | 5/1997 | McEwan |
| 5,659,502 A | | 8/1997 | Sali et al. |
| 5,809,553 A | * | 9/1998 | Choi et al. .................. 711/170 |
| 5,874,896 A | * | 2/1999 | Lowe et al. ................ 340/572.1 |
| 5,936,454 A | | 8/1999 | Joardar |
| 6,023,188 A | | 2/2000 | Lee et al. |
| 6,031,757 A | * | 2/2000 | Chuang et al. .......... 365/185.04 |
| 6,040,773 A | | 3/2000 | Vega et al. |
| 6,147,605 A | | 11/2000 | Vega et al. |
| 6,154,014 A | | 11/2000 | Suu |
| 6,252,508 B1 | | 6/2001 | Vega et al. |
| 6,297,974 B1 | | 10/2001 | Ganesan et al. |
| 6,320,230 B1 | | 11/2001 | Yu |
| 6,496,112 B1 | | 12/2002 | Vega |
| 6,753,704 B2 | | 6/2004 | Desgrez et al. |
| 6,859,085 B2 | | 2/2005 | Watanabe et al. |
| 6,937,514 B2 | | 8/2005 | Hasegawa |
| 6,946,950 B1 | | 9/2005 | Ueno et al. |
| 7,007,145 B2 | * | 2/2006 | Schrodinger et al. ......... 711/164 |
| 7,046,071 B1 | | 5/2006 | Conn et al. |
| 7,075,412 B1 | * | 7/2006 | Reynolds et al. ............ 340/10.2 |
| 7,108,183 B1 | * | 9/2006 | Cox, Jr. .................... 235/462.01 |
| 7,167,090 B1 | * | 1/2007 | Mandal et al. ........... 340/538.14 |
| 7,321,300 B2 | * | 1/2008 | Friedrich et al. ......... 340/539.11 |
| 7,538,678 B2 | * | 5/2009 | Jung et al. ................... 340/572.1 |
| 7,570,034 B2 | | 8/2009 | Nitta et al. |
| 7,853,236 B2 | | 12/2010 | Ootaka et al. |
| 7,873,767 B2 | * | 1/2011 | Moritani et al. ................ 710/74 |
| 7,961,078 B1 | * | 6/2011 | Reynolds et al. ............ 340/10.2 |
| 7,999,658 B1 | * | 8/2011 | Reynolds et al. ............ 340/10.2 |
| 8,115,597 B1 | * | 2/2012 | Oliver et al. ................. 340/10.1 |
| 2002/0008989 A1 | | 1/2002 | Honigschmid |
| 2002/0175806 A1 | * | 11/2002 | Marneweck et al. ...... 340/10.33 |
| 2003/0132784 A1 | | 7/2003 | Desgrez et al. |
| 2004/0212008 A1 | | 10/2004 | Hasegawa |
| 2004/0246103 A1 | * | 12/2004 | Zukowski .................. 340/10.41 |
| 2004/0257899 A1 | | 12/2004 | Lee et al. |
| 2005/0073197 A1 | * | 4/2005 | Matsubara et al. .......... 307/10.5 |
| 2005/0162145 A1 | | 7/2005 | Smith et al. |
| 2005/0212661 A1 | * | 9/2005 | Friedrich ..................... 340/10.5 |
| 2005/0270141 A1 | * | 12/2005 | Dalglish ...................... 340/10.4 |
| 2005/0274800 A1 | * | 12/2005 | Chapman et al. ............. 235/432 |
| 2006/0104134 A1 | | 5/2006 | Kim et al. |
| 2006/0109085 A1 | * | 5/2006 | Tiernay et al. ............... 340/10.1 |
| 2006/0109087 A1 | * | 5/2006 | Kim et al. .................. 340/10.34 |
| 2006/0125606 A1 | * | 6/2006 | Chen et al. .................. 340/10.51 |
| 2006/0267730 A1 | * | 11/2006 | Steinke et al. ............... 340/10.1 |
| 2007/0008070 A1 | * | 1/2007 | Friedrich ..................... 340/10.1 |
| 2007/0128760 A1 | | 6/2007 | Subramanian et al. |
| 2007/0132588 A1 | * | 6/2007 | Jung et al. .................. 340/572.1 |
| 2007/0176756 A1 | * | 8/2007 | Friedrich ................... 340/10.51 |
| 2007/0199988 A1 | * | 8/2007 | Labgold et al. ............... 235/385 |
| 2007/0210776 A1 | | 9/2007 | Oka |
| 2007/0273481 A1 | * | 11/2007 | Soleimani .................... 340/10.1 |
| 2007/0276985 A1 | * | 11/2007 | Schuessler .................... 711/100 |
| 2008/0001094 A1 | | 1/2008 | Korthout et al. |
| 2008/0001724 A1 | * | 1/2008 | Soleimani et al. ......... 340/10.51 |
| 2008/0001725 A1 | * | 1/2008 | White et al. ............... 340/10.51 |
| 2008/0012685 A1 | * | 1/2008 | Friedrich et al. ............. 340/5.25 |
| 2008/0034183 A1 | * | 2/2008 | Drago et al. .................. 711/219 |
| 2008/0059659 A1 | * | 3/2008 | Moritani et al. .................. 710/8 |
| 2008/0061946 A1 | * | 3/2008 | Suzuki ....................... 340/10.51 |
| 2008/0129506 A1 | * | 6/2008 | Schuessler ................. 340/572.1 |
| 2008/0158926 A1 | | 7/2008 | Umeda et al. |
| 2009/0195289 A1 | | 8/2009 | Subramanian et al. |
| 2010/0148845 A1 | | 6/2010 | Kato |
| 2010/0245212 A1 | | 9/2010 | Dallas et al. |
| 2011/0148591 A1 | * | 6/2011 | Reynolds et al. ............ 340/10.2 |
| 2011/0210832 A1 | * | 9/2011 | Suzuki ....................... 340/10.51 |

OTHER PUBLICATIONS (B) EPCglobal Inc. "Specification for RFID Air Interface-EPC Radio-Frequency Identity Protocols Class-1 Generation-2 UHF RFID Protocol for Communications at 860 MHz-960 MHz, Version 1.0.8." EPCglobal Inc., Dec. 14, 2004. http://www.epcglobalinc.org.
(C) Declaration of Stacy L. Jones authenticating attached Website Materials as accessed and posted at http://www.autoid.org/SC31/sc_31_wg4_sg3.htm on Sep. 1, 2006.
Final Office Action, U.S. Appl. No. 12/042,117, mailed Aug. 18, 2011.
Non-Final Office Action U.S. Appl. No. 11/877,054 mailed Aug. 30, 2010.
Non-Final Office Action U.S. Appl. No. 12/042,117 mailed Apr. 12, 2011.
Specification for RFID Air Interface: EPCTM Radio-Frequency Identity Protocols Class-1 Generation-2 UHF RFID Protocols for Communications at 860 MHz—960 MHz Version 1.2.0, 2004-2008 EPCglobal Inc. Oct. 23, 2008, 1-108.

\* cited by examiner

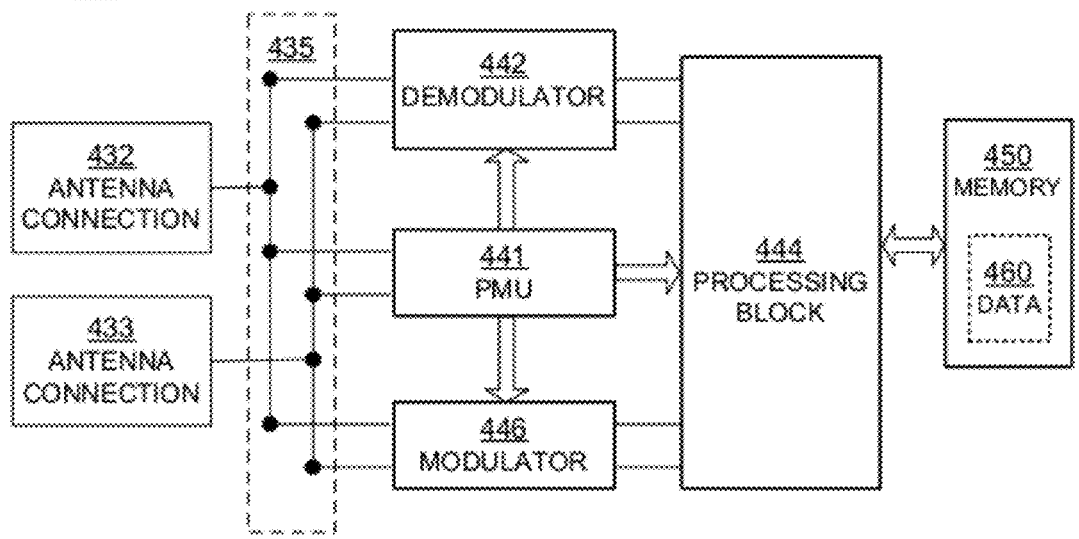
FIG. 4  RFID TAG COMPONENTS
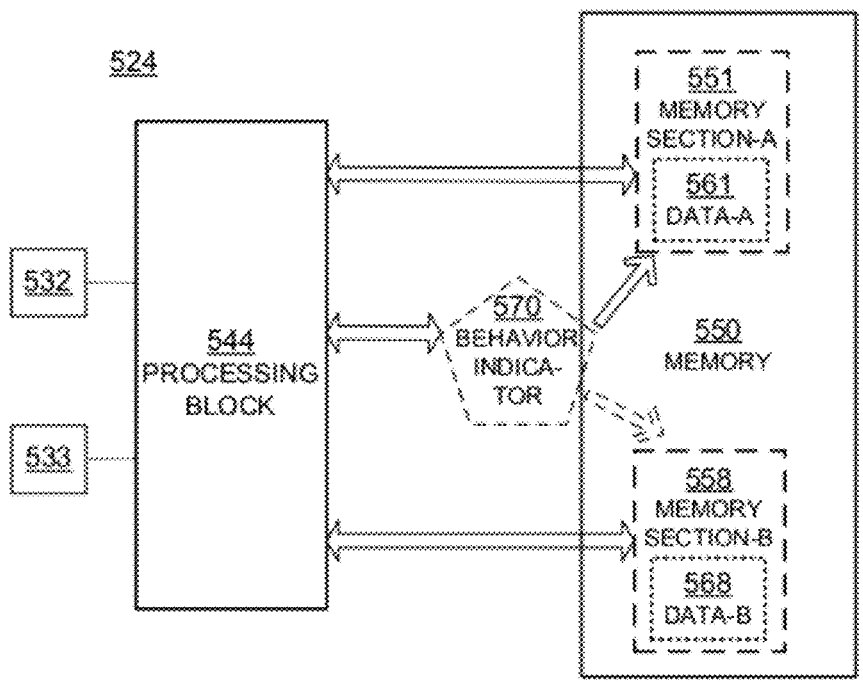
FIG. 5  MAPPING ALTERNATIVE MEMORY SECTIONS

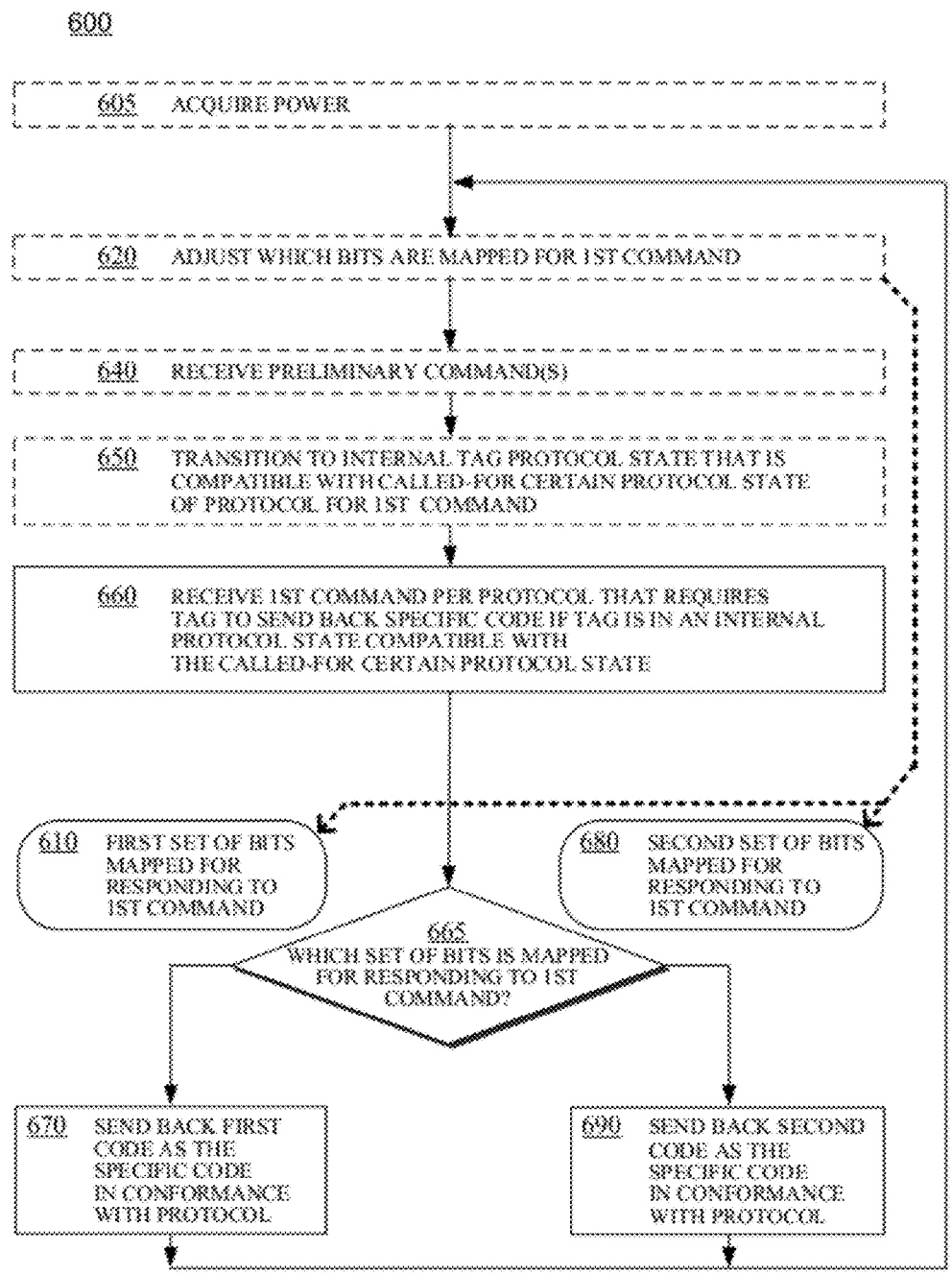
FIG. 6      *METHODS FOR RFID TAGS OR TAG IC CHIPS*

1000

| WHICH BEHAVIOR: | TYP. MEMORY DESIGNATION | SECTION-A DATA: | SECTION-B DATA: |
|---|---|---|---|
| REPORTED / WRITTEN: PRODUCT IDENTITY | EPC | "EPC-A" | "EPC-B" |
| REPORTED / WRITTEN: TAG IDENTITY | TID | "TID-A" | "TID-B" |
| ... TAG / PORTIONS: ... SELECTABLE / NOT ... READABLE / NOT ... WRITEABLE / NOT ... LOCKABLE / NOT ... ACCESSIBLE / NOT ... KILLABLE / NOT ... ETC. ... | OTHER | "OTHER-A" | "OTHER-B" |

1020 → WHICH BEHAVIOR
1050 → TYP. MEMORY DESIGNATION
1010 → SECTION-A DATA
1080 → SECTION-B DATA

*TYPES OF TAG BEHAVIORS THAT CAN BE CONTROLLED BY ALTERNATIVE MEMORY MAPPINGS*

| MEM BANK NAME | MEM BANK LOGICAL BIT ADDR | BEHAVIOR STATE | PHYS WORD ADDR | CONTENT (BITS) MSB         LSB |
|---|---|---|---|---|
| USER (11(2)) | ... | | ... | ... |
| | ... | | ... | ... |
| | 40(h)-4F(h) | | 34 | "USER DATA" [ ] |
| | 30(h)-3F(h) | | 33 | "USER DATA" [ ] |
| | 20(h)-2F(h) | | 32 | "USER DATA" [ ] |
| | 10(h)-1F(h) | 1410 BEHAVIOR STATE A' OF TAG | 31 | "USER DATA" [ ] |
| | 00(h)-0F(h) | | 30 | "USER DATA" [ ] |
| TID (10(2)) | ... | | ... | ... |
| | ... | | ... | ... |
| | 40(h)-4F(h) | | 24 | "TID-DATA" [ ] |
| | 30(h)-3F(h) | | 23 | "TID-DATA" [ ] |
| | 20(h)-2F(h) | | 22 | "TID-DATA" [ ] |
| | 10(h)-1F(h) | 1470 BEHAVIOR INDICATOR | 21 | "TID-DATA" [ ] |
| | 00(h)-0F(h) | | 20 | "TID-DATA" [ ] |
| EPC (01(2)) | ... | | ... | ... |
| | ... | | ... | ... |
| | 40(h)-4F(h) | | 14 | "EPC-DATA" [ ] |
| | 30(h)-3F(h) | | 13 | "EPC-DATA" [ ] |
| | 20(h)-2F(h) | | 12 | "EPC-DATA" [ ] |
| | 10(h)-1F(h) | 1480 BEHAVIOR STATE B' OF TAG | 11 | PC [15:0] |
| | 00(h)-0F(h) | | 10 | CRC-16 [15:0] |
| RESERVED (00(2)) | ... | | ... | ... |
| | ... | | ... | ... |
| | 40(h)-4F(h) | | 4 | ... |
| | 30(h)-3F(h) | | 3 | ACCESS PWD [15:0] |
| | 20(h)-2F(h) | | 2 | ACCESS PWD [31:16] |
| | 10(h)-1F(h) | | 1 | KILL PWD [15:0] |
| | 00(h)-0F(h) | | 0 | KILL PWD [31:16] |

*SAMPLE PARTIAL DETAILED TAG MEMORY MAP FOR FIRST DESIGNATION*

| MEM BANK NAME | MEM BANK LOGICAL BIT ADDR | BEHAVIOR STATE | PHYS WORD ADDR | CONTENT (BITS) MSB — LSB |
|---|---|---|---|---|
| ✕ | | | | |
| TID (10(2)) | | 1410 BEHAVIOR STATE 'A' OF TAG | | |
| | 10(h)-1F(h) | | 21 | "TID-DATA" [ ] |
| | 00(h)-0F(h) | 1470 BEHAVIOR INDICATOR | 20 | "TID-DATA" [ ] |
| EPC (01(2)) | 40(h)-4F(h) | | 24 | "TID-DATA" [ ] |
| | 30(h)-3F(h) | | 23 | "TID-DATA" [ ] |
| | 20(h)-2F(h) | | 22 | "TID-DATA" [ ] |
| | 10(h)-1F(h) | 1480 BEHAVIOR STATE 'B' OF TAG | 11 | PC [15:0] |
| | 00(h)-0F(h) | | 10 | CRC-16 [15:0] |
| | ... | | ... | ... |
| | ... | | ... | ... |
| RESERVED (00(2)) | 40(h)-4F(h) | | 4 | ... |
| | 30(h)-3F(h) | | 3 | ACCESS PWD [15:0] |
| | 20(h)-2F(h) | | 2 | ACCESS PWD [31:16] |
| | 10(h)-1F(h) | | 1 | KILL PWD [15:0] |
| | 00(h)-0F(h) | | 0 | KILL PWD [31:16] |

*SAMPLE PARTIAL DETAILED TAG MEMORY MAP FOR SECOND DESIGNATION*

FIG. 14B

*POSSIBLE INTERNAL TAG PROTOCOL STATES FOR DIFFERENT BEHAVIORS*

RFID TAGS RECEIVING BEHAVIOR CHANGE COMMANDS
AT DIFFERENT POWER LEVELS

RFID TAG CHIPS AND TAGS WITH ALTERNATIVE BEHAVIORS AND METHODS

CROSS REFERENCE TO RELATED APPLICATIONS

This application claims priority from U.S.A. Provisional Application Ser. No. 61/043,049 filed on Apr. 7, 2008, the disclosure of which is hereby incorporated by reference for all purposes.

This application claims priority from U.S.A. Provisional Application Ser. No. 61/047,653 filed on Apr. 24, 2008, the disclosure of which is hereby incorporated by reference for all purposes.

This application claims priority from U.S.A. Provisional Application Ser. No. 61/053,331 filed on May 15, 2008, the disclosure of which is hereby incorporated by reference for all purposes.

This application claims priority from U.S.A. Provisional Application Ser. No. 61/090,381 filed on Aug. 20, 2008, the disclosure of which is hereby incorporated by reference for all purposes.

This application claims priority from U.S.A. Provisional Application Ser. No. 61/101,047 filed on Sep. 29, 2008, the disclosure of which is hereby incorporated by reference for all purposes.

This application is a continuation-in-part of co-pending U.S.A. pending patent application Ser. No. 11/872,774, filed Oct. 16, 2007, entitled "RFID TAG CHIPS AND TAGS WITH ALTERNATIVE MEMORY LOCK BITS AND METHODS", commonly assigned herewith.

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader reads a tag code, information can be learned about the associated item that hosts the tag, and/or about the tag itself.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags are called passive tags.

With RFID tag usage proliferating, tagged items are now becoming commonplace in the consumer environment. Challenges arise because of the concern that someone would try to surreptitiously read the RFID tags of others.

SUMMARY

The invention improves over the prior art.

Briefly, the present invention provides RFID tags, ICs for RFID tags, and methods. In some embodiments, an RFID tag includes a memory with multiple sections, and a processing block. The processing block may map one of these sections, or another of these sections, for purposes of responding to a first command from an RFID reader. An RFID tag can operate according to the data stored in the section mapped at the time. In some embodiments, a tag can even transition from mapping one of the sections to mapping another of the sections.

RFID tags according to embodiments can be used in many applications. A tag operating according to different mapped data can exhibit different behaviors, for example exhibiting alternative identities of the tag, or of its host item. Plus, by remapping, a tag can be electronically altered to enhance consumer privacy and protect sensitive data.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which:

FIG. 4 is a block diagram of an implementation of an electrical circuit formed in an IC of the tag of FIG. 2.

FIG. 5 is a block diagram of components of an electrical circuit formed in a tag IC according to embodiments.

FIG. 6 is a flowchart for illustrating methods for RFID tags and tag ICs according to embodiments.

FIG. 10 is a table showing types of tag behaviors that can be different according to embodiments.

FIG. 14A is a sample partial detailed memory map for a tag, which implements a first mapping designation according to embodiments, such as the first mapping designation of FIG. 13.

FIG. 14B is a sample partial detailed alternative memory map for the tag of FIG. 14A, which implements a second mapping designation according to embodiments, such as the second mapping designation of FIG. 13.

DETAILED DESCRIPTION

Figure 1:
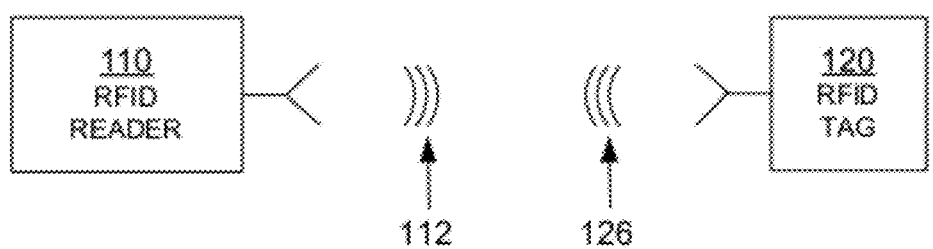
FIG. 1 is a block diagram of components of an RFID system according to embodiments.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. This description is, therefore, not to be taken in a limiting sense.

As has been mentioned, the present invention provides RFID tags, ICs (also known as chips) for RFID tags, and methods. The invention is now described in more detail.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are in a suitable range of frequencies. Such ranges include those near 900 MHz, 2.4 GHz, and so on.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e., having its own power source. Where tag 120 is a passive tag, it is powered from wave 112.

Figure 2:
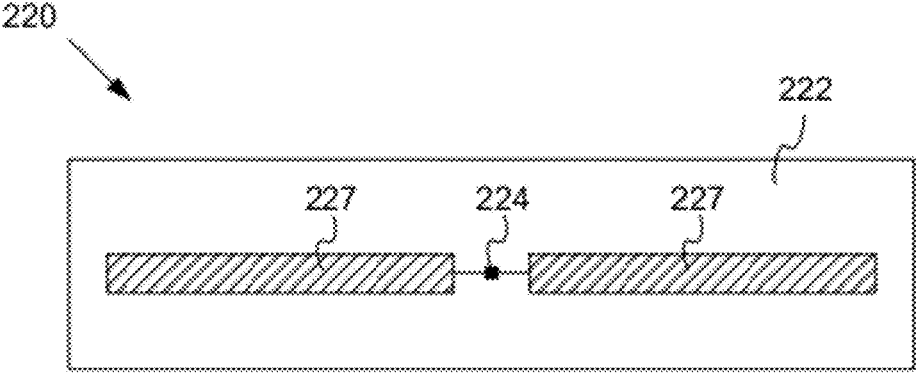
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from the wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternatively be formed on IC 224, and so on.

The components of the RFID system of FIG. 1 may communicate with each other in any number of modes. One such mode is called full duplex. Another such mode is called half-duplex, and is described below.

Figure 3:
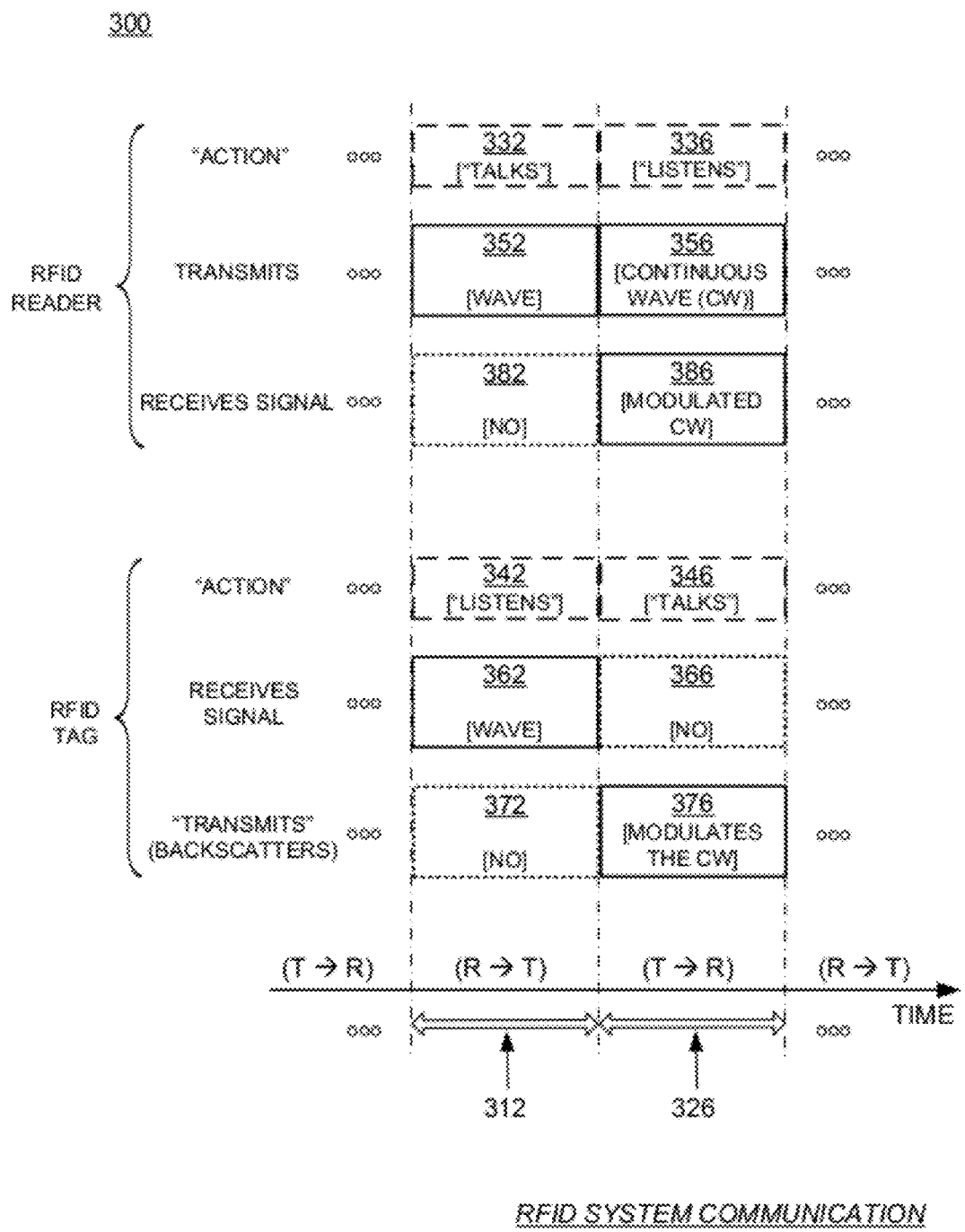
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are described in protocols. A protocol is a specification that calls for specific manners of signaling between the reader and the tags.

One such protocol is called the Specification for RFID Air Interface—EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO. Version 1.1.0 of this protocol is hereby incorporated by reference.

In addition, a protocol can be a variant of a stated specification such as the Gen2 Spec, for example including fewer or additional commands than in the stated specification, and so on. In such instances, some commands can be the same as those of the stated specification, or equivalent to them. For example, the Query command of the Gen2 Spec v.1.1.0, if duly followed by other commands, results in singulating a tag from other tags. Further sending an ACK command ordinarily causes a singulated tag to return its Electronic Product Code. Another protocol may have an equivalent command, i.e. one that will have the same effect. Some protocols, such as the Gen2 Spec, allow adding commands that implement new or different functionality. These commands are sometimes called custom commands.

FIG. 4 is a block diagram of an electrical circuit 424. Circuit 424 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 includes at least two antenna connections 432, 433, which are suitable for coupling to one or more antenna segments (not shown in FIG. 4). Antenna connections 432, 433 may be made in any suitable way, such as using pads and so on. In a number of embodiments more than two antenna connections are used, especially in embodiments where more antenna segments are used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Power Management Unit (PMU) 441. PMU 441 may be implemented in any way known in the art, for harvesting raw RF power received via antenna connections 432, 433. In some embodiments, PMU 441 includes at least one rectifier, and so on.

In operation, an RF wave received via antenna connections 432, 433 is received by PMU 441, which in turn generates power for components of circuit 424. This is true for either or both reader-to-tag (R→T) and tag-to-reader (T→R) sessions, whether or not the received RF wave is modulated.

Circuit 424 additionally includes a demodulator 442. Demodulator 442 demodulates an RF signal received via antenna connections 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 460. Memory 450 can be implemented by a single type of memory bits, or by multiple types. Preferably, memory 450 includes Nonvolatile Memory (NVM) bits, which allow at least some of data 460 to be retained even when circuit 424 does not have power, as is frequently the case for a passive RFID tag.

In general, an IC made according to embodiments includes a first set of memory bits for storing first data, and a second set of memory bits for storing second data. These multiple sets of memory bits can be implemented in any number of ways. In some embodiments, the first and the second sets of memory bits can be wholly distinct from each other. In other embodiments, the first set of memory bits is a subset or a superset of the second set of memory bits. In yet other embodiments, they may intersect. An example is now described.

FIG. 5 is a block diagram of components 524 of an electrical circuit formed in a tag IC according to embodiments. It will be recognized that some of components 524 correspond to analogous components in circuit 424. Components 524 include antenna connections 532, 533, similar to antenna connections 432, 433, for coupling to an antenna. Only two antenna connections 532, 533 are shown, but more are possible, etc.

Components 524 additionally include a memory 550, analogous to memory 450. Memory 550 may include a Memory Section A 551, and a Memory Section B 558. Memory Section A 551 has a first set of memory bits, and Memory Section B 558 has a second set of memory bits. It should be kept in mind that, in the embodiment of FIG. 5, Memory Section A 551 is shown as wholly distinct from Memory Section B 558, but that is only in the example of FIG. 5. While Memory Section A 551 does not itself coincide exactly with Memory Section B 558, the two could have portions that overlap, or one could be a subset of the other, as will be recognized from the later examples.

The first set of memory bits in Memory Section A 551 stores Data A 561, and the second set of memory bits in Memory Section B 558 stores Data B 568. Again, Data A 561 is shown as wholly distinct from Data B 568, but that is only in the example of FIG. 5. Some of Data A 561 could be shared with Data B 568, if any of the respective memory bits are shared. And, even if not shared, some of Data A 561 could be identical with some of Data B 568.

Components 524 moreover include a processing block 544 made according to embodiments. Processing block 544 can be coupled to the tag antenna via antenna connections 532, 533. As such, processing block 544 can receive via the antenna commands that have been issued by an RFID reader, and can operate in conformance with these commands, as specified according to a communication protocol. Such protocols have been described above. Some of these protocols define distinct called-for protocol states for the tag, and accordingly for processing block 544.

Often such protocols require a tag to send a specific response to a first interrogator command, if the tag is in an internal tag protocol state that is compatible with a certain one of the called-for protocol states. In some embodiments, processing block 544 can indeed be capable of being in an internal tag protocol state that is compatible with the certain called-for protocol state. In some embodiments, processing block 544 can be capable of implementing the present invention with a single internal tag protocol state, which can be compatible by being a state that backscatters an EPC. In other embodiments, processing block 544 can be capable of attaining also additional protocol states. Implementation-wise, if there are such additional protocol states, processing block 544 can have a protocol state machine to point to which internal tag protocol state the processing block is in. Whereas microscopically, processing block 544 can be in one or another internal tag protocol state, macroscopically it can be said that the IC chip or the whole RFID tag is in this or that protocol state. Although the internal tag protocol states of processing block 544 can be the same as the called-for protocol states, this embodiment is preferred but not necessary for practicing the invention.

Often the protocol requires a tag receiving a first interrogator command to send a specific code in response, if the tag is in a state compatible with a certain one of the called-for protocol states. Processing block 544, or its host tag, can start by being in such a compatible state, or it can start from a different state and then transition to the compatible state. Transitioning can be performed in any number of ways. In some embodiments, transitioning can happen in response to receiving one or more preliminary commands, etc. In fact, a number of protocols require such transitioning, and specify how it is to take place. Often this transitioning is performed as part of the tag becoming singulated from other tags.

If processing block 544 is in a state compatible with the certain called-for protocol state, it may be able to send a reply code as the specific code, in response to the first command. Sending the reply code can be in conformance with the protocol. A protocol state has been called compatible for purposes of this document, in that the reply code is indeed sent with such conformance, whether it is merely a compatible protocol state or the exact protocol state.

Processing block 544 can additionally map either the first set of memory bits that are part of Memory Section A 551 or, alternatively, the second set of memory bits that are part of Memory Section B 558. If processing block Gen2 544 maps the first set of memory bits in Memory Section A 551, which stores the first data, then the reply code can be a first code that is derived at least in part from the mapped first data. Alternatively, if processing block 544 maps the second set bits in Memory Section B 558, which stores the second data, then the reply code can be a second code. The second code, derived at least in part from the mapped second data, is often different from the first code.

It will be further understood that, while only two memory sections 551, 558 are shown among components 524, the invention is not so limited. For example, there could a third memory section, with a third set of memory bits, for storing third data. A processing block according to some embodiments can map the third set of memory bits instead of the first or second, such that, if the processing block were to receive the first interrogator command while in a state compatible with a certain one of the called-for protocol states, the reply code could be a third code derived at least in part from the third data, and different from the first code and the second code.

In general, an IC made according to embodiments optionally also includes a behavior indicator. If provided, the behavior indicator may indicate which of the first set and the second set of memory bits is being mapped by the processing block. In the example of FIG. 5, components 524 additionally include an optional behavior indicator 570. If provided, behavior indicator 570 indicates either the first set of memory bits in Memory Section A 551, or the second set of memory bits in Memory Section B 558. Accordingly, behavior indicator 570, if provided, further indicates either Data A 561, or Data B 568.

A behavior indicator is not required explicitly by the invention. In some embodiments, the behavior state is indicated instead by the context, examples of which will be given later in this document.

If provided, behavior indicator 570 can be implemented in any number of ways. In some embodiments, but not necessarily all, the behavior indicator is encoded in one or more values stored in respective one or more memory cells of the IC. This is depicted in FIG. 5 by showing optional behavior indicator 570 as straddling the boundary of tag memory 550. If the behavior indicator is indeed encoded in one or more memory values then these values can even be values of the first data, the second data, etc.

The invention also includes methods. Such methods according to embodiments are now described more particularly.

FIG. 6 is flowchart 600 illustrating methods according to embodiments. The methods of flowchart 600 may be practiced by different embodiments, including but not limited to RFID tags, tag IC chips, and processing blocks made according to embodiments, for example of the type described in this document. In addition to flowchart steps, mapping states are also depicted. What is described below for processing blocks applies also to RFID tags and tag IC chips that include such a processing block.

At optional operation 605, a processing block for an RFID tag IC acquires power. This power acquisition can be performed by rectifying the power from a wave of an RFID reader.

At optional next operation 620, there is an adjustment of which memory bits the processing block maps, for purposes of responding to a first command by a reader, in the event that this first command is indeed received. Operation 620, to the extent it is performed, will be described later in this document. Whether operation 620 is performed or not, its outcome is a mapping state 610 or, alternatively, a mapping state 680, which are further included with flowchart 600. Mapping state 610 corresponds to a first set of bits being mapped by the processing block, such as those bits included in Memory Section A 551 of FIG. 5. Mapping state 680 corresponds to a second set of bits being mapped by the processing block, such as those bits included in Memory Section B 558.

At optional next operation 640, one or more preliminary commands are received. These can be per the protocol, for singulating the tag, for performing other functions, and so on.

At optional next operation 650, the processing block can transition to a protocol state that is compatible with the certain called-for protocol state for processing the first command, as per the above. Operation 650 can be in response to operation 640, or not. In addition, it should be kept in mind that operation 650 is optional, because the processing block may start by being in that compatible protocol state.

At next operation 660, the first command is indeed received, according to a protocol that the reader is using. Typically such a protocol defines distinct called-for protocol states for the tag, and further requires the tag to send a specific code in response to the first command, if the tag is in a state compatible with a certain one of the called-for protocol states. Examples of the first command include commands that request the tag's Electronic Product Code (EPC), Tag IDentifier (TID), a portion of the User Memory (UM), and so on. More examples are described later in this document. At operation 660, the first command is received at sufficient power for the tag to respond. By sufficient, it is meant that the tag would ordinarily send the specific code without invoking any error codes of the type used to signify insufficient power.

At optional next operation 665, the method inquires which set of bits is mapped by the processing block for responding to the first command. The answer can be the indicated mapping state 610, or alternatively the indicated mapping state 680, as per the above. In addition the answer can be derived from the behavior indicator, if provided.

If the answer is mapping state 610, then, at next operation 670, a first code is sent back in response to the first command, as the specific code requested by the first command. The first code is derived at least in part from the mapped first data, as per mapping state 610.

Alternatively, if the answer is mapping state 680, then, at next operation 690, a second code is sent back in response to the first command, as the specific code requested by the first command. The second code is derived at least in part from the mapped second data, as per mapping state 680.

Regardless of whether method 600 or components 524 are considered, the tag sends back a reply code, which is either the first code or the second code depending on whether the tag is in mapping state 610 or mapping state 680. In either case the reply code of the invention is the intended reply to the first command, and not normally an error code for the first command not being right, or its power not being sufficient to respond, or the like. Some implications are now described in more detail.

Figure 7:
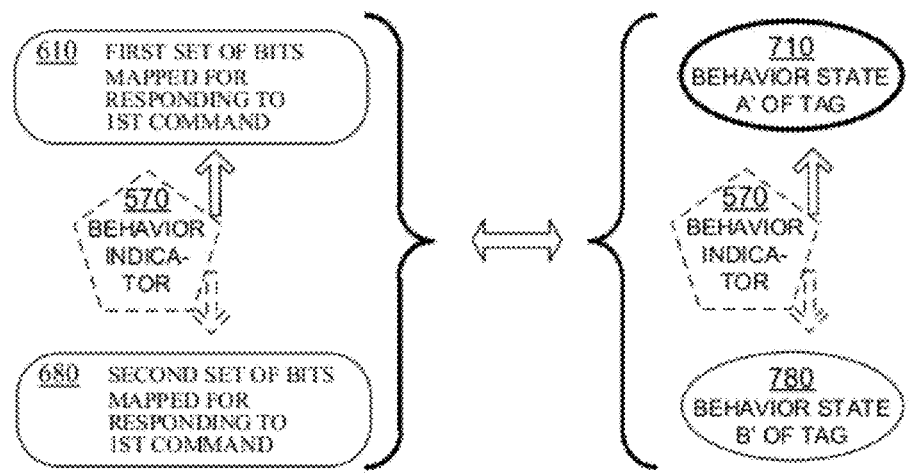
FIG. 7 is a conceptual diagram illustrating that an RFID tag that uses the components of FIG. 5 can be in one of different behavior states, correspondingly exhibiting alternative behaviors, according to embodiments.

FIG. 7 is a conceptual diagram 700, illustrating the alternative mapping states 610 and 680. Behavior indicator 570, if provided, accordingly indicates which one of mapping states 610 and 680 is the answer to the inquiry of operation 665.

In addition, two different behavior states 710, 780 can be considered for the processing block, or the tag IC, or for the whole tag. Behavior state 710 corresponds to mapping state 610, and is characterized by the reply code being the first code of operation 670. Behavior state 780 corresponds to mapping state 680, and is characterized by the reply code being the second code of operation 690. Behavior indicator 570, if provided, accordingly indicates whether the processing block behaves according to the first behavior state 710 or, alternatively, the second behavior state 780.

Because the first code is generally different from the second code, the processing block, and thus the IC chip, and thus also the whole tag, may be considered as exhibiting alternative behaviors. These alternative behaviors can be characterized as the tag, or its IC chip, or its processing block, being in one of behavior states 710, 780. Behavior states 710, 780, for purposes of this document, are distinct from the protocol states.

These alternative behaviors can be used to advantage in tagging schemes for RFID solutions. In particular, these alternative behaviors may amount to a single tag appearing to be two or more different tags at different times, depending on whether the reply code is the first code or the second code. Moreover, in embodiments where the reply code is indeed sent back with complete conformance, the reader that has sent the first command may be unable to tell whether the tag is further able to behave differently, and send a different reply code to the first command. In some embodiments, the existence of an alternative behavior may be communicated to the reader by encoding in the first code an appropriate message, and so on. In that case, RFID readers and Application Programming Interfaces can be made for detecting the message, and so on. In other embodiments, the existence of an alternative behavior may not be communicated.

In the above examples, the behaviors are indicated as different only as to which code is sent as the reply code, but the invention is not limited this way—the behaviors can be further different in additional ways. For example, backscattering while in behavior state 710 can be at a different power level than in behavior state 780, for example by partially detuning the tag antenna, and so on. Moreover, the first or the second code can be rendered from data as it is stored in respective memory fields, or by scrambling the data, encrypting the data, and so on.

In addition, whether backscattering takes place at all can depend on other parameters, like the intensity of the wave of the reader. For example, in some embodiments, when in behavior state 710, the reply code is not sent unless the first command has been received at a power level higher than a first level. In other embodiments, when in behavior state 780, the reply code is not sent unless the first command has been received at a power level different from the first level. This way, the two behaviors can be further differentiated, as per the above.

Figure 8:
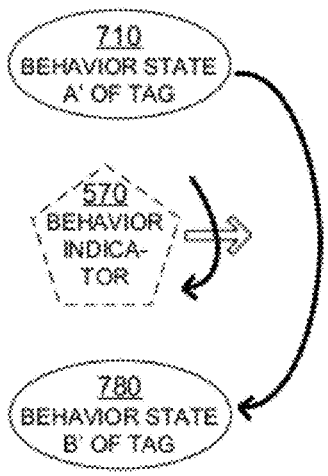
FIG. 8 is a diagram illustrating a tag transitioning from one of the behavior states of FIG. 7 to the other according to some embodiments.

FIG. 8 is a diagram 800 illustrating a tag transitioning from one of the behavior states of FIG. 7 to the other, according to some embodiments. Transitioning is indicated by an arrow going from behavior state 710 to behavior state 780. Behavior indicator 570, if provided, accordingly is switching from indicating behavior state 710 to indicating behavior state 780. As per the above, transitioning can be for the processing block, or the tag IC, or the whole tag.

The transitioning of FIG. 8 corresponds to the tag changing behavior, which can in some embodiments be tantamount to substituting one tag for another. This is further advantageous when the tag performs the transitioning electronically, without the need for physical handling. Electronic transitioning confers benefits when the tag is already on a host item and thus difficult or costly to access physically for substituting with another tag, as is described later in this document.

The transitioning of FIG. 8 can be reversible, or not. In some embodiments, after transitioning, the processing block can no longer map the first set of memory bits. In others, after transitioning, the processing block is further operable to transition back to mapping the first set of memory bits. In this latter case, if the processing block were to then receive the first command while in a state compatible with a certain one of the called-for protocol states, it would cause the tag to send in response the first code.

The transitioning of FIG. 8 can be implemented by the processing block transitioning from mapping the first set of memory bits to mapping the second set of memory bits. This alternative mapping was first hinted at as optional operation 620 in the method of FIG. 6, and is now described in more detail.

Figure 9:
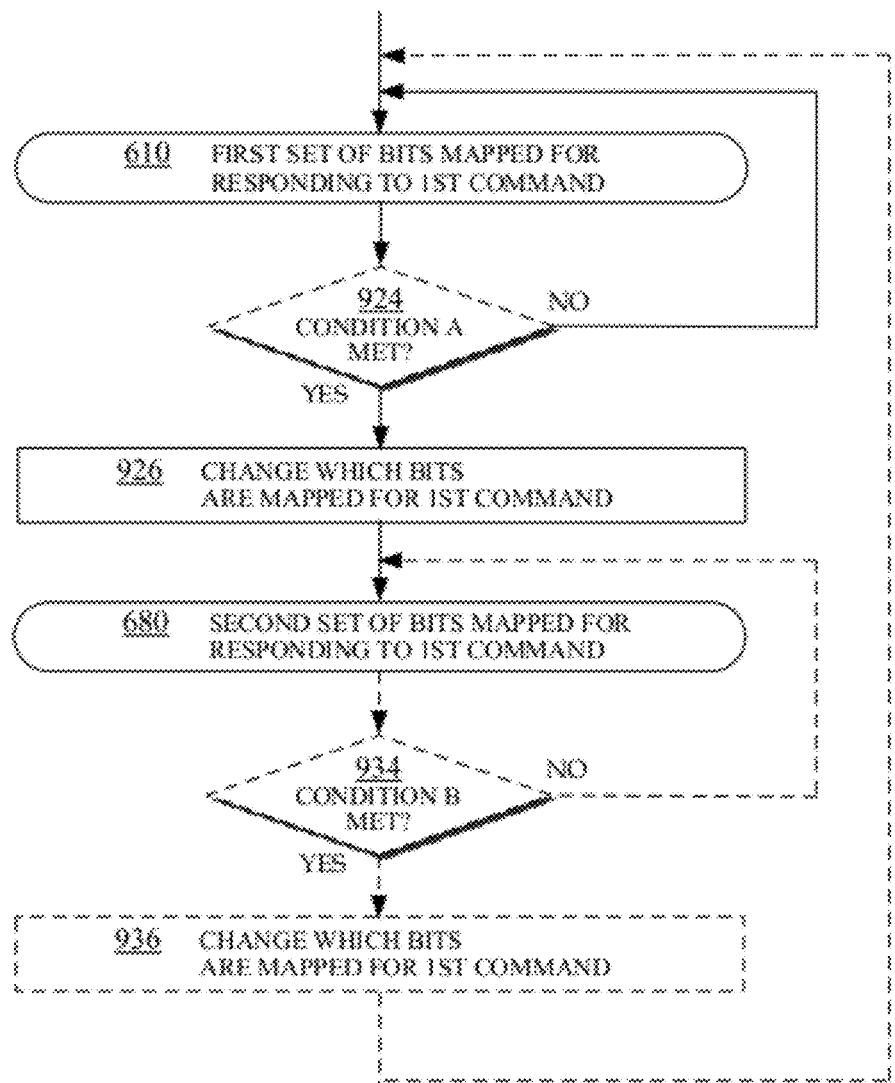
FIG. 9 is a flowchart for illustrating an operation of the method of FIG. 6 according to embodiments.

FIG. 9 is a flowchart 920 for illustrating more detailed embodiments of operation 620 of FIG. 6. In addition to flowchart steps, the mapping states 610, 680 are also depicted. Flowchart 920 starts with mapping state 610.

At a next operation 926, there can be a change as to which bits are mapped for responding to the first command. If so, mapping 680 can be arrived at.

At optional further operation 936, there can be a further change as to which bits are mapped for responding to the first command. If so, mapping 610 can be returned to.

Flowchart 920 also includes optional operations 924, 934. According to those, the transitioning of operations 926, 936 takes place only if respective conditions A, B are met. As such, the tag behavior can be controlled, and be switched when a desirable event takes place. There are many such possible desirable events. For example, transitioning can be performed in response to the processing block gaining power after having lost power, or after a certain period of time.

In some embodiments the tag IC can further include a counter, which can count responsive to events. These events can be any suitable type of events, such as number of times the tag was singulated, or other events related to attempts to use, attempts to match an on-board password, or expected lifetime of the tag. In such embodiments, transitioning can be performed in response to the counter having counted to a limit. If the counts are small, the reply code could be the EPC, whereas if multiple successive inventorying attempts are made, the tag could reply to some with one identity, and to others with an alternate identify.

Additionally, in some embodiments, the tag IC can further include a volatile memory cell, which can store a value temporarily, and then discontinue storing the value. Discontinuing would happen if, for example, the volatile memory cell discharges. In such embodiments, transitioning can be performed in response to the volatile memory cell discontinuing storing the value, while the processing block is powered. Under the right conditions, the volatile memory cell can optionally be further refreshed, etc.

Moreover, in some embodiments, transitioning can be performed in conjunction with otherwise transitioning from one of the tag's protocol states to another. In other embodiments, transitioning can be performed without transitioning from one of the tag's protocol states to another.

Gating events can be used for preventing the inadvertent or unauthorized switching of behavior states. For example, in some embodiments, a behavior switch enable command must be received by the tag first, before the transitioning can take place, and so on. Such commands can further be validated with passwords, etc. In others, the current behavior state can be locked.

In a number of embodiments, transitioning is performed in response to the processing block receiving a behavior change command from the RFID reader. The behavior change command can be distinct from the first command, or derived from the first command. Additionally, the behavior change command may be distinct from, the same as, or derived from the behavior switch enable command.

If the behavior indicator is implemented, it can change which of the first set and the second set of memory bits it indicates, in response to the behavior change command. Moreover, if the behavior indicator is encoded in one or more values stored in memory cells of the IC, the behavior change command can cause the behavior indicator to be changed by rewriting the one or more values.

There are many possible embodiments for such a behavior change command. If a tag further operates according to a protocol, the behavior change command may be a custom command, preferably defined so as to not contradict the protocol.

It is desirable to control when the behavior change command will actually cause the tag to transition from one behavior state to the other. Controlling can be performed in a number of ways. For example, in some embodiments, the protocol by which the reader sends the first command defines at least two tag protocol states, and the processing block is capable of being in either one of these two protocol states. In some such embodiments, transitioning from one behavior state to another is performed only if the processing block is in one of these protocol states, but not in the other. For example, if the tag adheres to the Gen2 Spec v.1.1.0, the tag may only implement the behavior change command if it is received while the tag is in the Secured protocol state, but not in another state or set of states.

Moreover, in some embodiments, transitioning can be conditioned on authenticating the reader transmitting the behavior change command. For example, in some embodiments, a password is stored in the IC, such as in tag memory. Then transitioning is performed only if the behavior change command meets a preset condition about the password. The password can be derived at least in part from one of the first data and the second data. In some embodiments, the password is a tag access password equivalent to the access password specified in the Gen2 Spec v.1.1.0. In the above example, if the tag adheres to the Gen2 Spec v.1.1.0, for the tag to reach the Secured protocol state the reader must first send the access password, if the tag's stored access password has a nonzero value. Plus, more than one password can be implemented, for example depending on the direction of the transition. Moreover, transitioning can be performed only if the behavior change command is received at a power that exceeds a threshold, etc.

FIG. 10 is a table 1000 showing types of tag behaviors that can be different according to embodiments. Column 1020 shows possible tag behaviors. Column 1050 indicates how memory sections that implement the possible behaviors can be typically designated, by various protocols. Here, "EPC" stands for Electronic Product Code, and relates to the host item to which an RFID tag is affixed. So, it is about identifying the host item. "TID" stands for Tag IDentifier, and relates to identifying the RFID tag itself. The contents of EPC, TID, and "Other" are defined by tagging schemes, or by different parties, such as those establishing the protocols, the tag manufacturers, or users.

In table 1000, columns 1010, 1080 indicate the data in each of the designated memory sections. The two columns represent alternative data and corresponding alternative tag behaviors. Mapping selects the data, which thereby controls the behavior accordingly. For each behavior, data can be selected from either column 1010, or column 1080. In some embodiments, a particular type of data can be used only for a particular type of behavior (e.g. EPC for reported/written product identity). In others, as will be seen below, some types of data may be used in more than one type of behavior.

Figure 11:
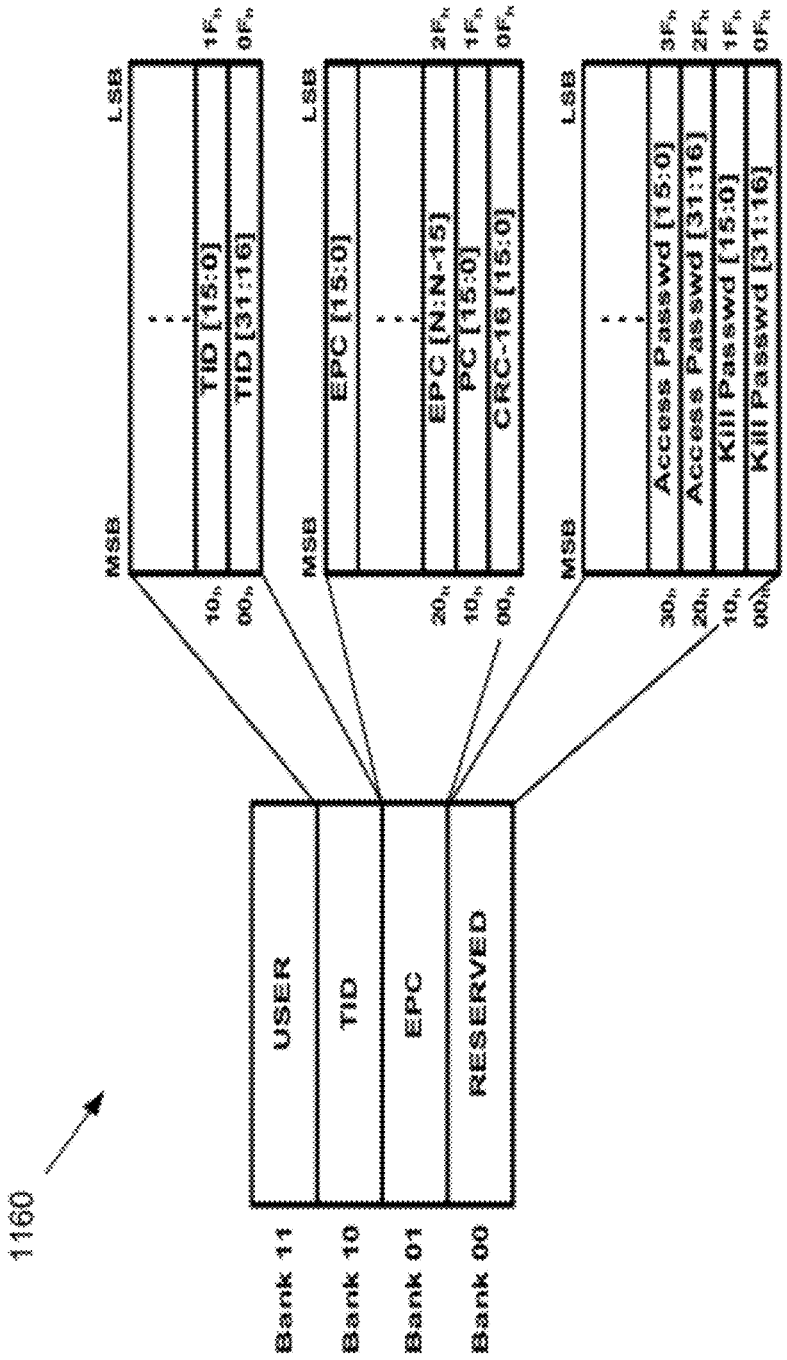
FIG. 11 is a detailed tag memory map of a protocol in the prior art.

FIG. 11 is a detailed tag memory map 1160 of a protocol in the prior art. The protocol in question is the Gen2 Spec v.1.1.0, and map 1160 appears in Section 6.3.2.1 as FIG. 6.17 of that document. Map 1160 shows how compliant RFID tags are to address specific memory sections. The EPC and TID sections may correspond to those introduced in FIG. 10. In addition, the designated Reserved Memory and User Memory may correspond to what is shown as "Other" in FIG. 10.

In map 1160, the logical addressing of each of the four shown memory banks begins at zero (00 h). The Gen2 Spec v.1.1.0 allows the physical memory underlying map 1160 to be vendor-specific, meaning that it could comprise a single memory element, multiple memory elements, etc. The Gen2 Spec v.1.1.0 merely requires that the tag logically expose map 1160 in its interactions with a reader. Gen2 v1.1.0 commands that read or write tag memory have a MemBank parameter that selects one of the shown four banks, and an address parameter to select a particular memory location within that bank.

Figure 12:
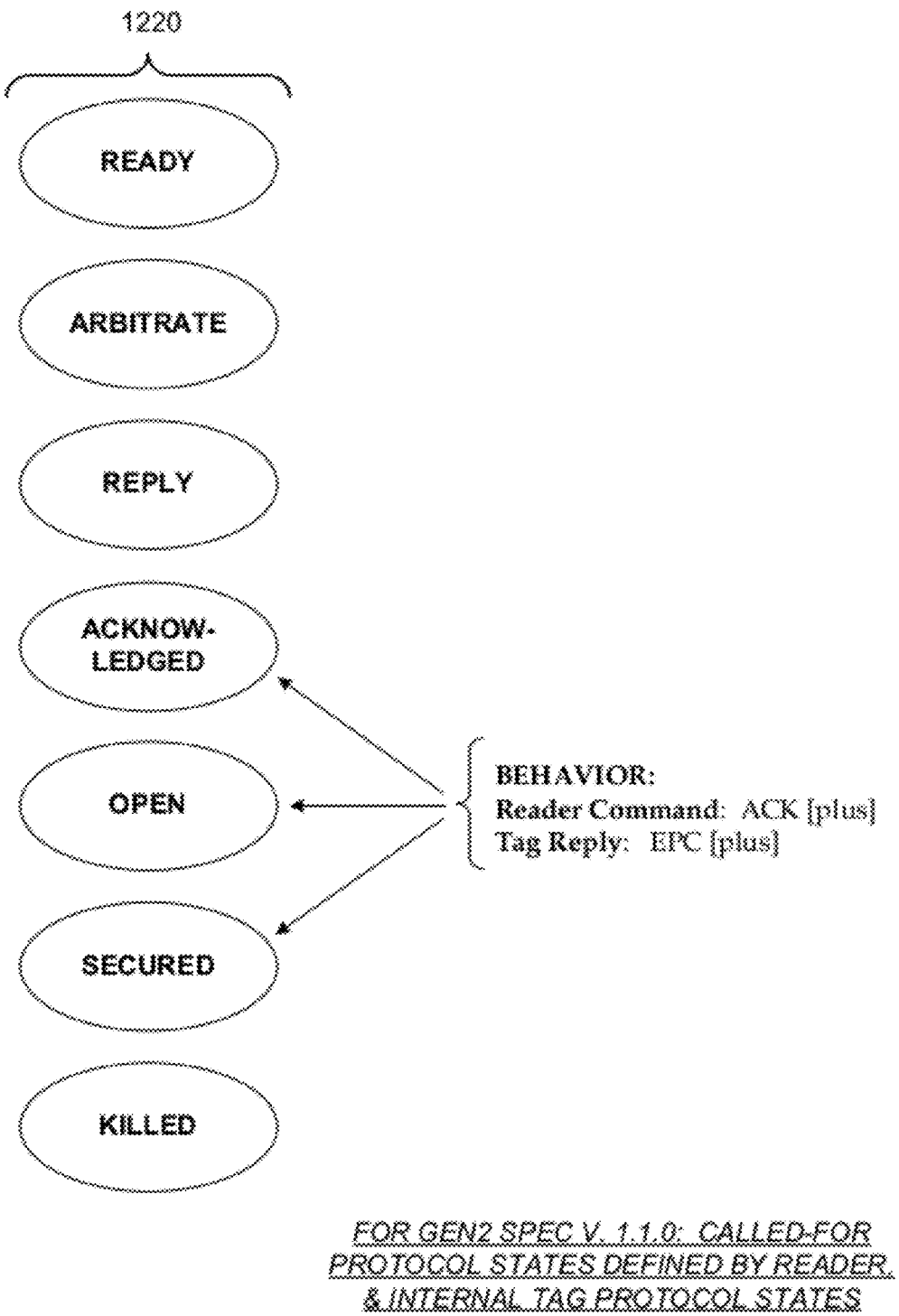
FIG. 12 is a diagram showing possible protocol states for a tag IC that complies with the protocol of FIG. 11, further illustrating that, in certain states, a command will cause the designated Electronic Product Code (EPC) field to be backscattered.

FIG. 12 is a diagram showing the called-for protocol states 1220 for a tag IC that complies with the Gen2 Spec v.1.1.0. These can be the called-for protocol states when the command is per the Gen2 Spec v.1.1.0. These can also be the possible internal protocol states of a tag that complies with the Gen2 Spec v.1.1.0.

Of protocol states 1220, Ready, Arbitrate and Reply are related to a tag being singulated by an RFID reader from among a population of RFID tags. In a number of prior art tags, a state machine is in one of these protocol states at a time. Some of the protocol commands cause the state machine to switch between protocol states.

As shown in FIG. 12, in some of these protocol states a tag may not reply to a reader with its EPC, but in certain other protocol states it can. Those protocol states in which it can are Acknowledged, Open, and Secured. In all of them a tag will backscatter its EPC in response to an ACK command, which in the above is called the first command. In addition to the EPC, more codes may be backscattered in response to the ACK command, as denoted by the "[plus]" in FIG. 12.

Figure 13:
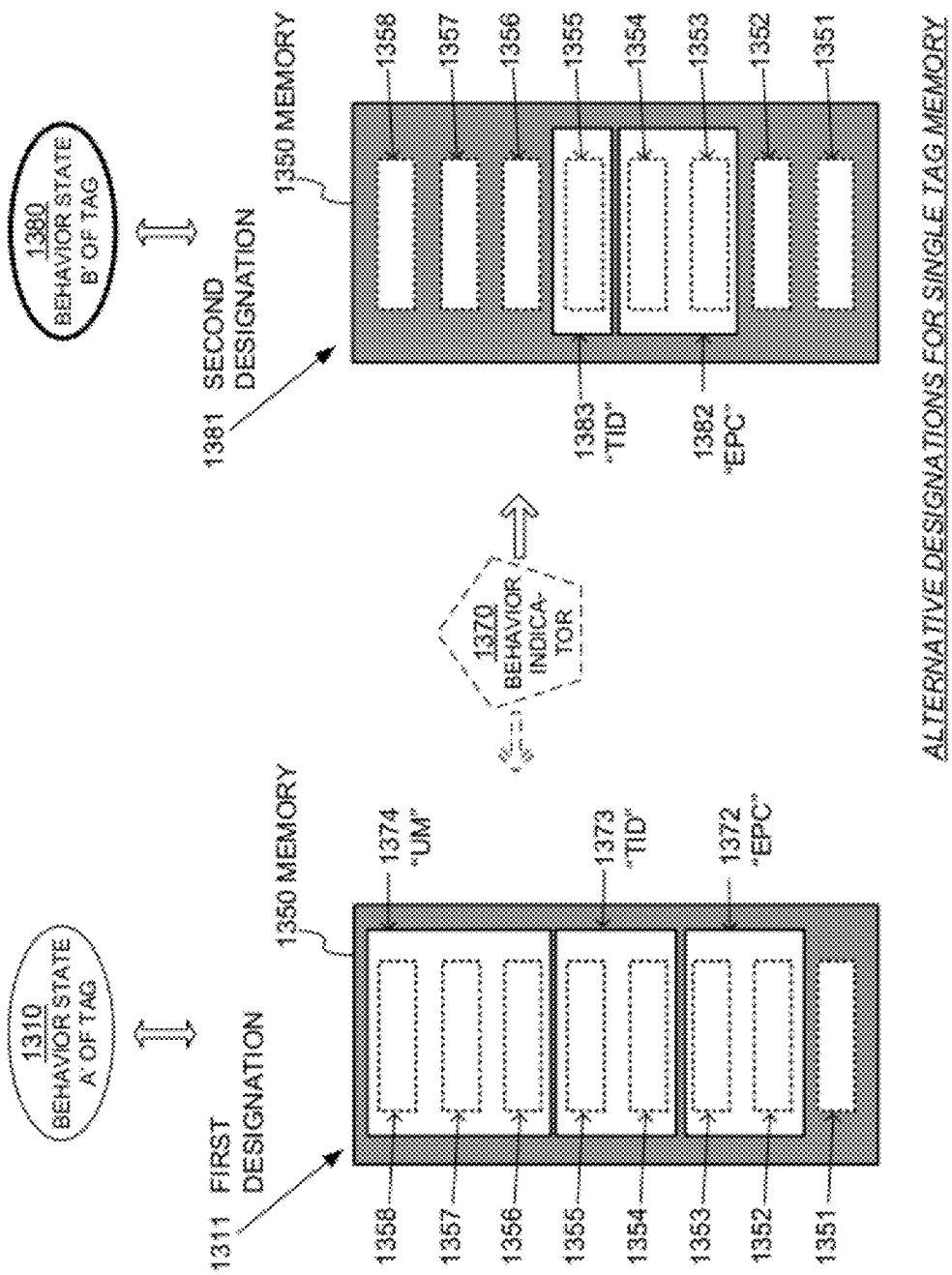
FIG. 13 is a diagram showing two alternative mapping designations of a single sample tag memory, according to embodiments.

FIG. 13 is a diagram showing two alternative mapping designations 1311, 1381 of a single sample tag memory 1350, according to embodiments. Designation 1311 corresponds to a behavior state A 1310, whereas designation 1381 corresponds to a behavior state B 1380. A behavior indicator 1370, if provided, can indicate either designation 1311, or designation 1381. In some embodiments, a tag can transition among these different designations.

Memory 1350 has fields 1351, 1352, . . . , 1358 of memory bits. These fields of memory bits are shown to be of the same size, but that is only as an example, and not as a limitation. Each field 1351, 1352, . . . , 1358 may store data. In this embodiment, some of the stored data is used differently in different designations, and therefore causes different tag behaviors.

In first designation 1311, a section 1372 is designated as "EPC", which includes fields 1352, 1353. In addition, a section 1373 is designated as "TID", which includes fields 1354, 1355. Moreover, a section 1374 is designated as User Memory ("UM"), which includes fields 1356, 1357, 1358. In some embodiments, these fields are in conformance with the applicable sections of FIG. 10.

In second designation 1381, a section 1382 is designated as "EPC", which includes fields 1353, 1354. In addition, a section 1383 is designated as "TID", which includes only field 1355. No other sections are indicated. Again, these can be in conformance with the applicable sections of FIG. 10.

It will be observed the data of field 1353 appears in both designations 1311, 1381, and in both as an EPC. Its relative location, however, is different in each of designations 1311, 1381.

It will be further observed the data of field 1354 also appears in both designations 1311, 1381, but it is treated differently. In first designation 1311, the data of field 1354 is part of the TID section 1373, whereas in second designation 1381, the data of field 1354 is part of the EPC section 1382.

In FIG. 13, first designation 1311 is intended as a general example, in that it need not conform to any specification. Moreover, first designation 1311 can be for a memory that is compliant with the Gen2 Spec v.1.1.0. For example, field 1351 can be considered as the Reserved Memory of FIG. 11, and so on.

It will be appreciated that a detailed memory map for a tag that can behave as in FIG. 13 will not be as simple as that of FIG. 11, because the tag can expose more than one memory map. Instead, partial memory maps can be used, one for each behavior. Assuming for the time being that the tag can expose two such behaviors, the individual partial maps can informally be called the first map and the second map, the public map and the private map, and so on. But such maps are only partial, in that neither describes the memory completely by itself. Instead, each partial map describes only one of the designations in the memory, and thus characterizes only one of the possible multiple behavior states.

An example is now described of two alternative partial memory maps for a single tag memory. In this example, the designations are intended to work with commands of the Gen 2 Spec v.1.1.0. In other words, these designations show sections that would be addressed by a compliant RFID tag upon receiving such commands for responding to them.

FIG. 14A is a sample detailed partial memory map 1412 for a tag. Map 1412 can be for implementing a first mapping designation, such as first mapping designation 1311 of FIG. 13. Map 1412 corresponds to a behavior state A 1410, as opposed to a behavior state B 1480. A behavior indicator 1470, if provided, indicates behavior state A 1410. While not necessary for practicing the present invention, the logical bit addressing in map 1412 is compliant with the necessary portions of the Gen2 Spec v.1.1.0 in this example. Map 1412 shows fields of bits in the rightmost column, also with sample physical addresses—in this case the addresses of physical memory words.

FIG. 14B is a sample detailed partial memory map 1482 that is an alternative to map 1412 for the same tag. Map 1482 can be for implementing a second mapping designation, such as second mapping designation 1381 of FIG. 13. Map 1482 corresponds to behavior state B 1480. While not necessary for practicing the present invention, the logical bit addressing in map 1482 is compliant with the necessary portions of the Gen2 Spec v.1.1.0 in this example. It will be noted that map 1482 provides no User Memory—in other words, it hides User Memory, similarly with how designation 1381 hid fields that designation 1311 permitted easy access to.

Attention is now drawn to the fields of memory bits with physical addresses 22-24, in both FIG. 14A and FIG. 14B. These bits, when the processing block is in behavior state A 1410, have logical addresses in the TID section, whereas when the processing block is in behavior state B 1480 they have logical addresses in the EPC section. As such, in some embodiments a different command will read them when the tag is in behavior state A 1410 versus when it is in behavior state B 1480. Of course, in other embodiments, a common command could read them regardless of whether the tag is in behavior state A 1410 or in behavior state B 1480, meaning that the command has a common kernel but different Membank and address fields in each instance.

Transitioning from mapping the first set of memory bits to mapping the second set of memory bits is sometimes called remapping. For example, a processing block could remap from the partial map of FIG. 14A to that of FIG. 14B.

As said, partial detailed maps 1412 and 1482 describe a single memory that can expose different alternative mappings. Note that in either of them, explicit behavior indicator 1470 is optional.

As mentioned above, in some embodiments a behavior indicator is implemented explicitly. In some of these embodiments, the behavior indicator is encoded in one or more values stored in respective one or more memory cells of the IC.

There are a number of ways for a stored behavior indicator to indicate which of a tag's partial memory maps the tag is to use. In some embodiments a logical memory address, when combined with the one or more values encoding the behavior indicator, may produce a physical address that the processing block uses to indicate the first set of memory bits, or alternatively the second set of memory bits. In some embodiments, the one or more values that encode the behavior indicator can be used as inputs to a multiplexer or a lookup table that remaps the logical addresses to the first set of memory bits, or alternatively to the second set of memory bits. Many other methods are possible, as will be obvious to one of ordinary skill in the art.

A behavior indicator can be explicitly implemented, but an explicit behavior indicator is not necessary for practicing the invention. As will be seen, indicating the behavior can be performed implicitly, using components that serve other functions.

In a number of embodiments, the processing block is capable of transitioning between two or more internal tag protocol states. As mentioned above, the internal tag protocol states can be the same as those called-for by the protocol under which the first command was sent, or different. If different, at least one can be compatible with the called-for state, for responding to the first command.

Moreover, in some embodiments, the processing block can be in at least two distinct internal tag protocol states, each of which is a compatible version of a single called-for protocol state. In other words, the command could call for the tag to be in a single internal protocol state, but the tag would actually be in one of two internal states, each of which is a compatible version of the called-for protocol state. The processing block could map the first set of memory bits while in one of these states, and the second set of memory bits while in the other state. These two internal states can be otherwise similar, in fact even identical for purposes of the protocol. If identical, the RFID reader might not know the difference.

This multiplicity of compatible states can be best described by considering the processing block as a state machine that transitions between its possible internal tag protocol states. Each internal protocol state determines what functions the tag can do, how the tag should respond to which commands, which behavior the tag exhibits, and so on. In such embodiments, at least two of the possible internal tag protocol states are compatible with a single called-for protocol state, and are otherwise two different versions of the same possible internal state, for some purposes of the tag. In other words, if the state machine is in either one of these two states when the first command is received, the tag will send in response a reply code in conformance with the protocol, the reply codes potentially being different depending on the memory designations for the two states. Two embodiments are now described. These embodiments build on the above described protocol of FIG. 12, but that is only by example and not by limitation.

Figure 15:
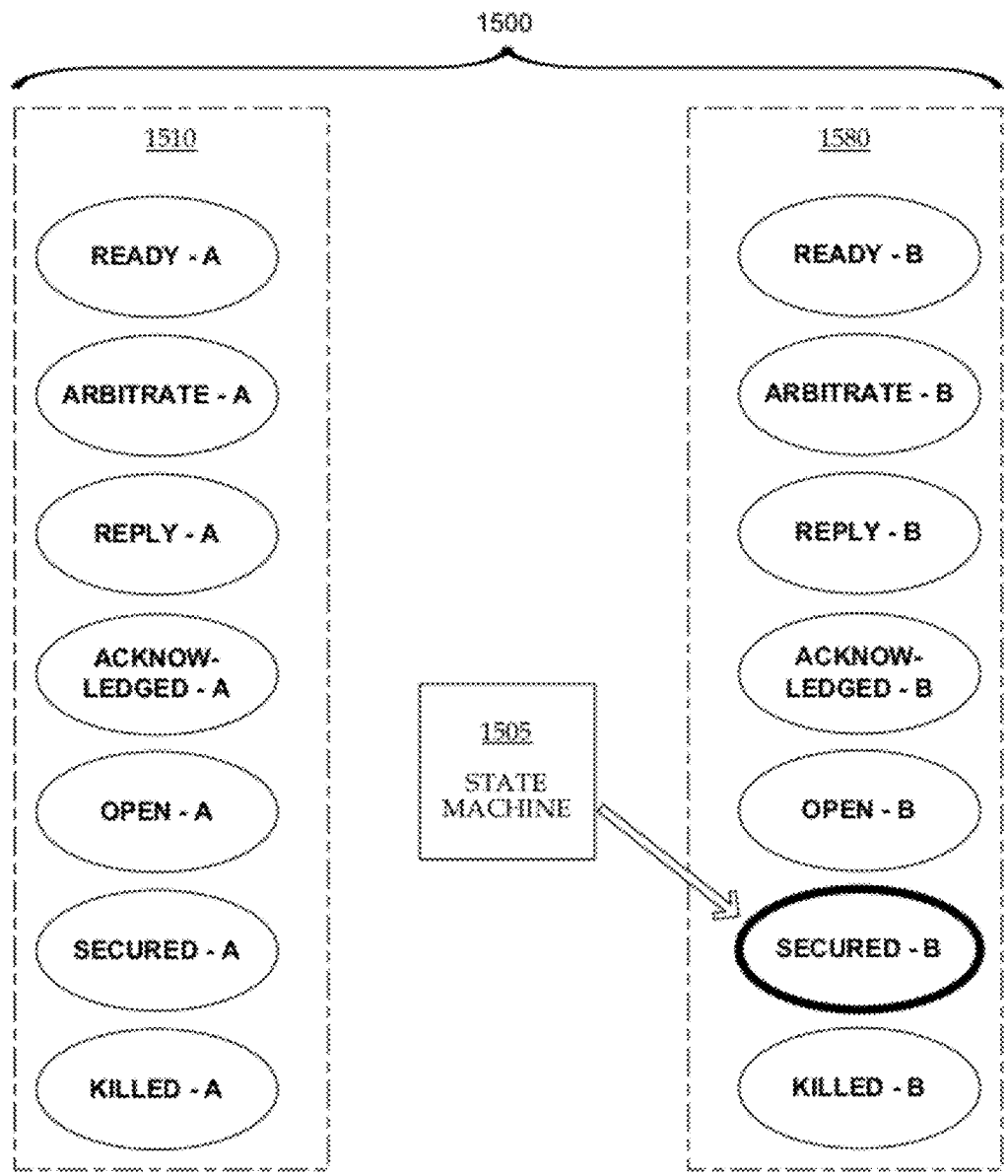
FIG. 15 is a diagram showing an embodiment of a state machine of a tag processing block that is capable of exhibiting alternative behaviors according to embodiments.

FIG. 15 is a diagram 1500 showing an embodiment of a state machine 1505 of a tag processing block. State machine 1505 can be in any one of the shown internal tag protocol states, which are subdivided into two subgroups 1510, 1580. It will be recognized that each of subgroups 1510, 1580, includes a version, A or B, of the protocol states of FIG. 12. The processing block may map a first set of memory bits while state machine 1505 is in a state in subgroup 1510, and a second set of memory bits while state machine 1505 is in a state in subgroup 1580. In some of the embodiments the tag can be compliant externally with the whole protocol, when state machine 1505 is in version 1510 or 1580 of the called-for protocol states.

Figure 16:
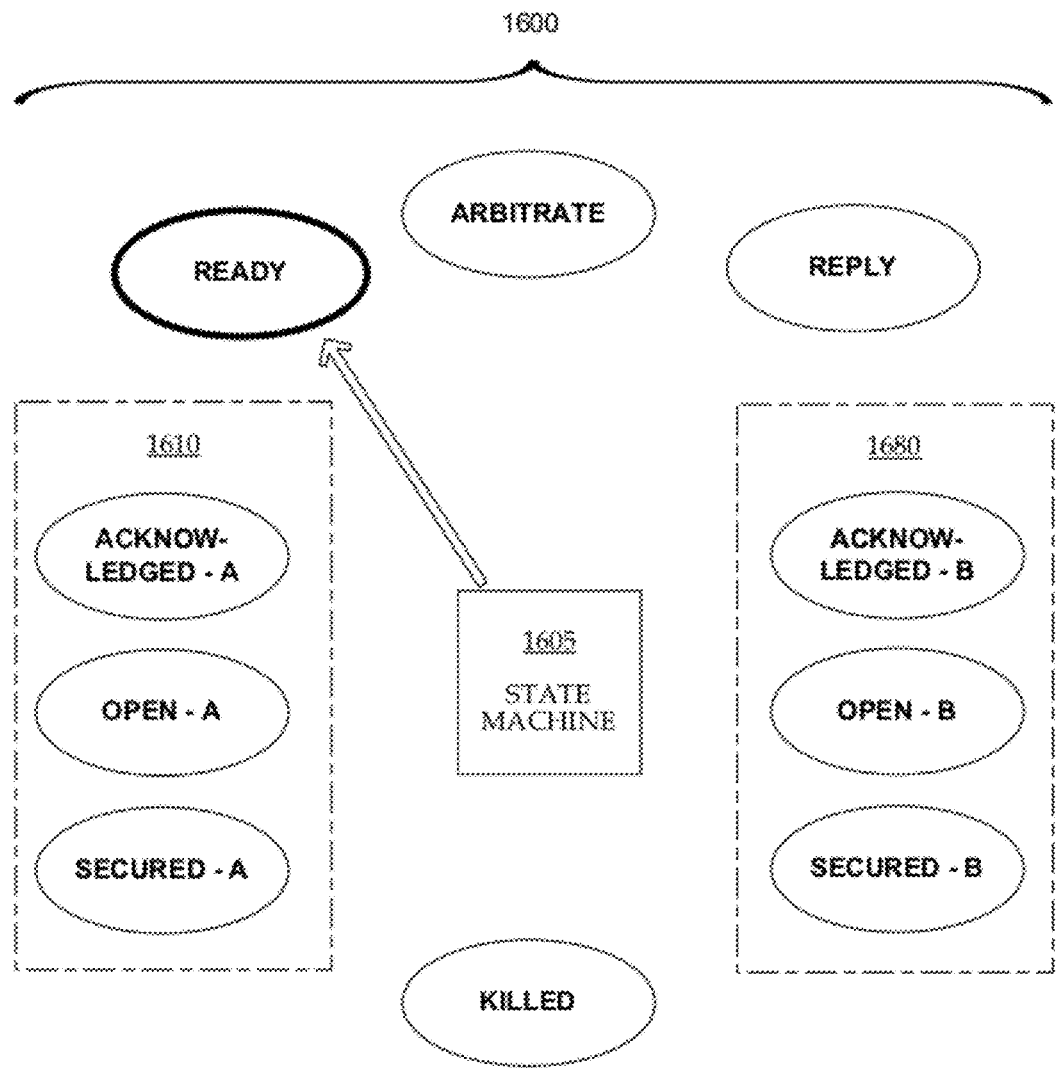
FIG. 16 is a diagram showing another embodiment of a state machine of a tag processing block that is capable of exhibiting alternative behaviors according to embodiments.

FIG. 16 is a diagram 1600 showing another embodiment of a state machine 1605 of a tag processing block. State machine 1605 can be in any one of the shown internal tag protocol states. It will be recognized that some of the states are shown singly, while those that cause the EPC to be sent are shown in two alternative versions, namely in subgroups 1610 and 1680. The processing block may map the first set of memory bits while state machine 1605 is in a state in subgroup 1610, and the second set of memory bits while state machine 1605 is in a state in subgroup 1680. In some of the embodiments the tag can be compliant externally with the whole protocol when state machine 1605 is in any of the versions (singly shown or the alternatives) of the called-for protocol states.

In some embodiments, for additional security, it is desirable to restrict when remapping can take place. In some embodiments the processing block can remap only while in some of its possible internal tag protocol states. More particularly, it is convenient to think of the internal tag protocol states possible for the processing block as belonging in different subsets. Each subset includes a number of possible internal tag protocol states, or just one internal tag protocol state. In some of these embodiments, remapping can be performed if the processing block is in one of the internal tag protocol states of a second subset, but not of a first subset. For example, if the processing block is capable of the internal protocol states of FIG. 12, it might be able to remap only from the Secured state.

The first and second subgroups of internal protocol states that have to do with when remapping is permitted should not be confused with those of where mapping is merely different, such as in FIG. 15 and FIG. 16. For example, in FIG. 15, the states in subgroup 1510 map the first set, while those in subgroup 1580 map the second set. Remapping could happen from any state, or be restricted to happen only from state Secured-A or state Secured-B. Similarly with the example of FIG. 16, remapping can be permitted only by transitioning to state Secured-A or to state Secured-B.

In some embodiments, there are additional restrictions, or combinations of restrictions, for the processing block to even enter that special internal protocol tag state or states from which remapping is possible. Such special states were characterized above as being in the second subset. For a first example, while some commands may require a minimum power level to be executed, the processing block may be unable to enter a state of the second subset unless it receives power at a higher level than the minimum. For a second example, a password can be stored in the IC, and the processing block is capable of entering one of the internal tag protocol states in the second subset only if the behavior change command meets a preset condition about the password. An example of that, again, is if remapping is permitted only from the Secured internal tag protocol state, or a version of that Secured state, in which case the password could be the Access password of the Gen2 spec v1.1.0.

Returning to FIG. 13, when there is a transition from first designation 1311 to second designation 1381, some data becomes harder to read or even unreadable with an RFID reader. This hard-to-read data includes all of User Memory 1374, plus the data of bit field 1352. Embodiments using this advantage of the invention are now described.

Figure 17:
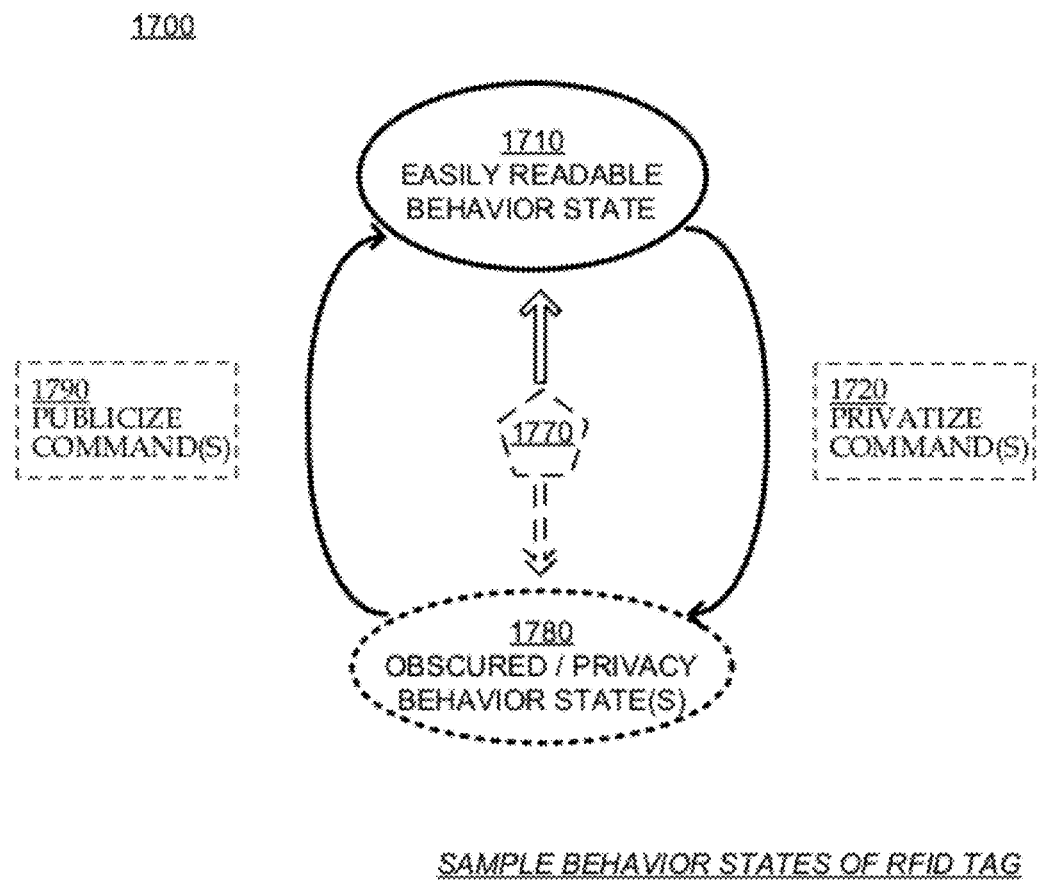
FIG. 17 is a conceptual diagram illustrating sample tag behavior states according to embodiments that are advantageous for using with RFID tags in the supply chain.

FIG. 17 is a conceptual diagram 1700 illustrating sample tag behavior states according to embodiments. Two behavior states 1710, 1780 are defined. A behavior indicator 1770 may be provided. While in behavior state 1710, the tag can be easily readable. This is sometimes referred to as the tag being in its "public" behavior. While in behavior state 1780, the tag is less easily readable. This is sometimes referred to as the tag being in its "obscured/privacy" behavior. It should be noted that state 1780 can be one behavior state, or more.

The tag can transition between behavior states 1710, 1780 using one or more behavior change commands. Behavior change commands 1720, also called "privatize" commands, can be used to cause a tag to transition from behavior state 1710 to behavior state 1780. Similarly, behavior change commands 1790, also called "publicize" commands, can be used to cause a tag to transition from behavior state 1780 to behavior state 1710.

As will be seen, an RFID tag can alternate between these behavior states 1710, 1780 for increased consumer privacy. Indeed, items that consumers buy can be tagged with such RFID tags according to embodiments. When an item is in the supply chain, its tag can be in behavior state 1710, greatly facilitating its handling, and thus generating cost savings. When the item is sold, its RFID tag can be caused to transition to behavior state 1780, for increased consumer privacy. In some of these embodiments, when the item is returned, the RFID tag can be caused to transition back to behavior state 1710, and so on.

In another embodiment, an RFID tag can alternate between behavior states 1710, 1780 for the purpose of inhibiting the counterfeiting of genuine items. When an item is in the supply chain, its tag can be in behavior state 1780, thereby obscuring one or more of the tag's memory fields from counterfeiters. As described above, the counterfeiter can be prevented from transitioning the tag to behavior state 1710 by a password or other security feature. A counterfeiter, not being able to view the obscured information when the tag is in behavior state 1780, cannot easily clone or duplicate the RFID tag. A legitimate distributor, retailer, or law-enforcement personnel can cause the tag to transition to behavior state 1710 and observe the obscured information, thereby determining that the item to which the tag is attached is genuine or a fake.

The behavior change commands 1720, 1790 can be implemented in any number of ways. They can be the same as each other, or different. Or they may be differentiated by one of their fields, or one of their parameters. Or they can be a parameter-less command that causes the tag to toggle between behavior states 1710 and 1780, or the like.

If it is desired to work with a protocol that does not normally include such commands, then the behavior change commands 1720, 1790 can be created as custom commands additional to the protocol. When so doing, it is desirable to take the whole protocol into account, so as to not arrive at an inconsistent scheme. In addition, other commands in the protocol can be consulted to determine the aspects that need caring for, to avoid such an inconsistency.

More particularly, the behavior change command can be implemented first by a command code. Its bits can be chosen in view of other commands, for their usual lengths and formats, but beyond that, the exact choice of 0s and 1s is merely a design choice. The behavior change command can optionally also have fields and a payload. One of its bits can be a code for the behavior indicator, to be written in tag memory.

In addition, a tag can have rules as to when to process the behavior change command, and when not to, as already mentioned above. It can also have rules as to what to backscatter, if anything, depending on whether the behavior change command is implemented successfully, or received but not implemented, or if the tag is unable to implement the command because of an error condition, and so on. Error conditions can be, for example, if the behavior change command is received with insufficient power, or an invalid handle, etc. In addition, these rules can specify what happens at different internal tag protocol states, and whether there is a transition between them, too.

Figure 18:
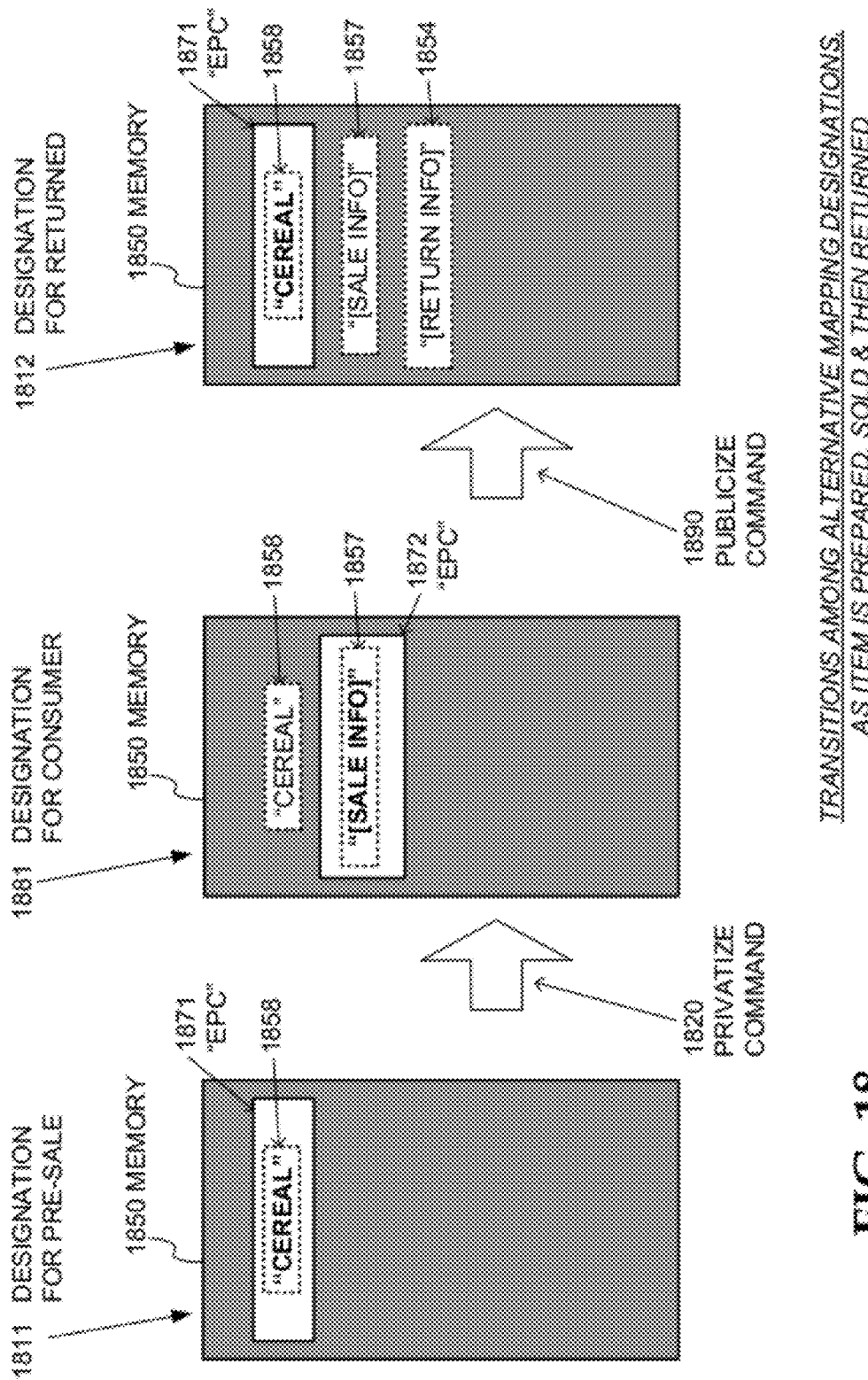
FIG. 18 is a diagram showing sample alternative tag memory mapping designations for a tag to exhibit the behaviors of FIG. 17 according to embodiments.

FIG. 18 is a diagram showing sample alternative mapping designations 1811, 1881, 1812 for tag memory 1850 of a tag that can exhibit the behaviors of FIG. 17 according to embodiments. For purposes of clarity, the sample designations of FIG. 18 are intended for tagging a product in a retail application, although as described above the present invention is not limited to retail applications. Mapping designations 1811, 1812 can be for the easily readable behavior state 1710, for use before an item is sold and after it is returned. Mapping designation 1881 can be for the privacy/obscured behavior state 1780, for use after an item is sold and before it is returned.

Memory 1850 has a field 1858, for writing a code that corresponds to the host item. In this example, field 1858 stores a code with the value "CEREAL", such as would be used for a cereal box. In designation 1811, section 1871 is the EPC, which includes field 1858. Accordingly, if the tag is inventoried it will report the contents of section 1871, including field 1858, for pre-sale logistics, handling, and the like.

A privatize command 1820 can transition memory 1850 to designation 1881, for example when the item is sold with the tag still attached. In an additional field 1857 of memory 1850, sale information can be written, for purposes of facilitating returns, legitimizing the sale, loss prevention, warranty, and the like. In some embodiments the sale information can be encrypted. This writing can take place prior to, in conjunction with, or even after the sale; it can also take place in conjunction with the privatize command 1820 being received. Moreover, in designation 1881, section 1872 is the EPC, which includes field 1857, but not 1858. Accordingly, if the tag is inventoried, it will report the contents of field 1857, but not those of field 1858, thus enhancing consumer privacy.

A publicize command 1890 can transition memory 1850 to designation 1812, for example when the item is returned with the tag still on it. In an additional field 1854 of memory 1850, return information can be written. This writing can take place in conjunction with or after the return; it can also take place in conjunction with the publicize command 1890 being received. It will be observed that, while designation 1812 provides for the use of field 1854, it is otherwise the same as designation 1811, for purposes of what can be read easily. In particular, in designation 1812, section 1871 is again the EPC, which includes again field 1858. Accordingly, if the tag is inventoried, it will report the contents of section 1871, including field 1858, for post-return logistics, handling, and the like.

Figure 19:
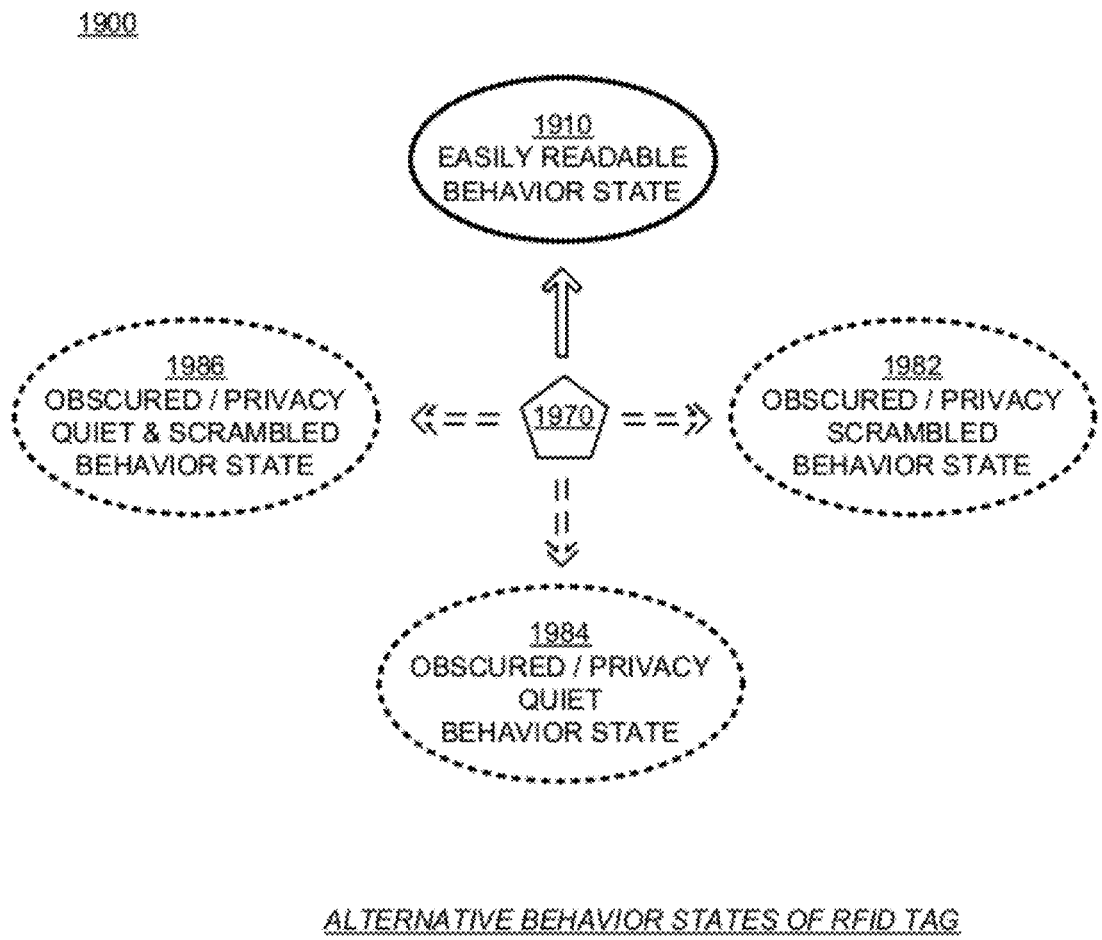
FIG. 19 is a conceptual diagram illustrating how the tag can be in one of different behavior states, which are more than the two behavior states of FIG. 17 according to embodiments.

FIG. 19 is a conceptual diagram 1900 illustrating how a tag can be in one of several different behavior states. FIG. 19 shows more than the two behavior states of FIG. 17 according to embodiments. Behavior state 1910 can be the same as behavior state 1710. Plus, there are three obscured/privacy behavior states, namely 1982, 1984, 1986. Of those, behavior state 1982 is an obscured/privacy/scrambled behavior state, in that its code is scrambled, making it harder to read by an unauthorized reader. Behavior state 1984 is an obscured/privacy quiet behavior state, in that will respond only to a reader whose signal is strong enough. In this state 1984 the tag will respond when the reader is nearby, but not when the reader is farther away, even though in both cases the reader signal may convey sufficient power for the tag to respond. And a tag in behavior state 1986 replies with a scrambled code only to a reader whose signal is strong enough. In some embodiments a tag can even reply from behavior state 1910 when the tag is nearby the reader and receiving a strong signal, but can automatically transition to one of behavior states 1982, 1984, 1986 when the tag is far from the reader and receiving a weak signal.

Figure 20A:
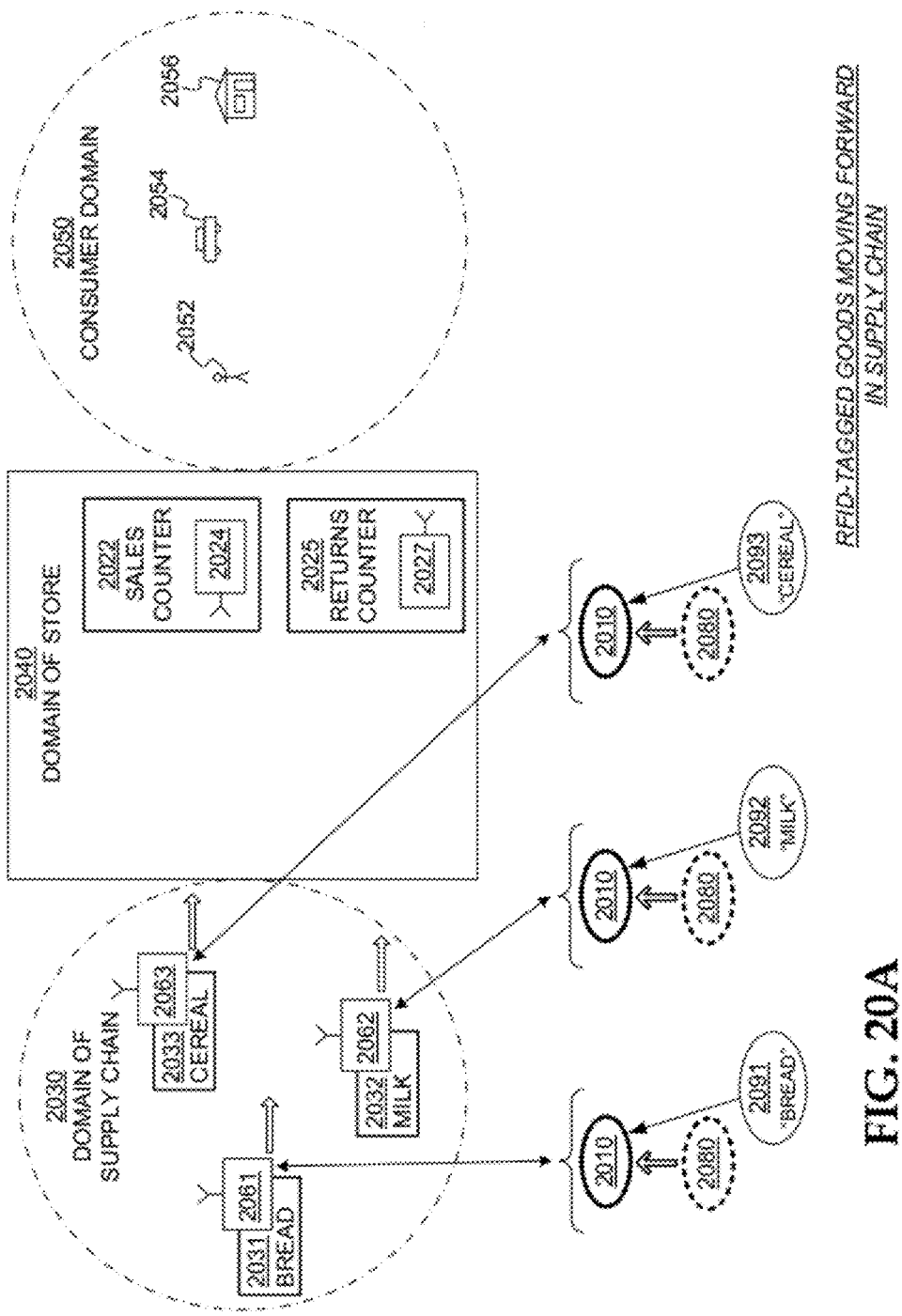
FIG. 20A is a diagram illustrating how, when goods that are moving through the supply chain, their RFID tags can be in an easily readable behavior state such as that of FIG. 17 according to embodiments.

Referring to FIGS. 20A-20F, examples are now provided for illustrating uses of the invention in retail applications. Referring first to FIG. 20A, three domains are examined, namely domain 2040 of a store, domain 2030 of a supply chain that is used for goods to reach the store, and domain 2050 of a consumer that might purchase the goods from the store.

Referring to FIG. 20A, goods are shown in supply chain domain 2030 as they are being brought to the store. These goods might be processed in distribution centers then trucked to the store, and so on. Three items are shown in this example, namely a loaf of bread 2031, a carton of milk 2032, and a box of cereal 2033, tagged respectively with RFID tags 2061, 2062, 2063 made according to embodiments.

In this example, each of RFID tags 2061, 2062, 2063 is capable of being either in a behavior state 2010, or in a behavior state 2080. Behavior state 2010 corresponds to the tag being easily readable, similarly to what was described above for behavior state 1710. Behavior state 2080 corresponds to an obscured/privacy state, similarly to what was described above for behavior state 1780.

As per FIG. 20A, each of RFID tags 2061, 2062, 2063 is in the easily readable behavior state 2010. If interrogated by a reader, tag 2061 would respond with a code 2091 for "bread", tag 2062 would respond with a code 2092 for "milk", and tag 2063 would respond with a code 2093 for "cereal". The individual memories of the tags can be as shown by pre-sale designation 1811 of FIG. 18.

In the subsequent drawings, to reduce complexity, the individual goods 2031, 2032, 2033, are no longer shown. Only their tags are shown, and are considered attached to the goods.

Figure 20B:
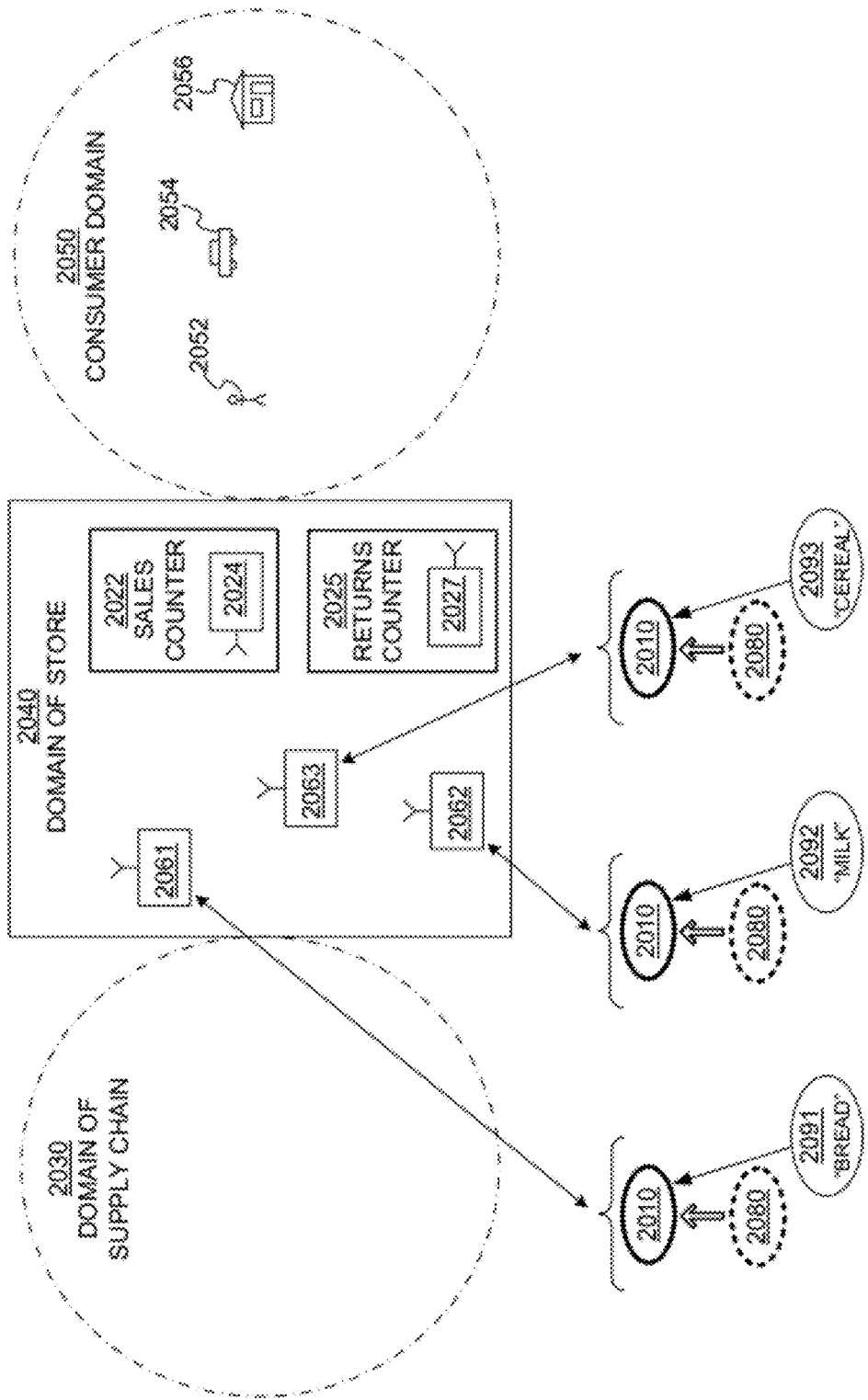
FIG. 20B is a diagram illustrating how, when the goods of FIG. 20A are in a store for sale to consumers, their RFID tags can be in an easily readable behavior state, such as the same behavior state of FIG. 20A, according to embodiments.

FIG. 20B illustrates how the goods of FIG. 20A have reached the store, and have been placed for sale at various locations in the store. The store also includes a sales counter 2022 with an RFID reader 2024, and a returns counter 2025 with an RFID reader 2027.

Like in FIG. 20A, tags 2061, 2062, 2063, if interrogated by a reader in FIG. 20B, would again respond with respective codes 2091, 2092, 2093 for readings of "bread", "milk", and "cereal" respectively, although other embodiments are also possible, for example in which the store remaps the codes or adds store or sale information to the tags prior to sale.

Figure 20C:
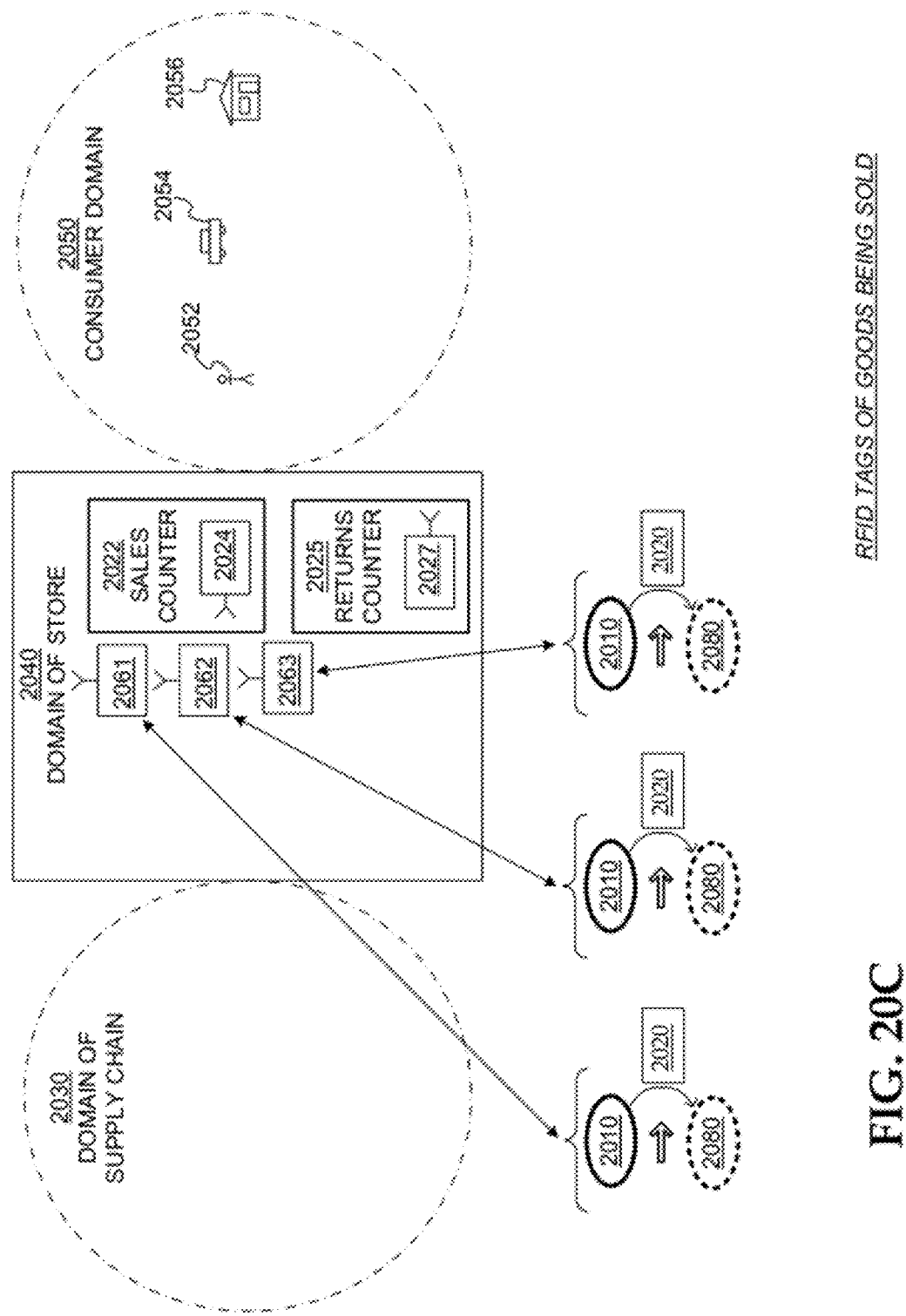
FIG. 20C is a diagram illustrating how, when the goods for sale in the store of FIG. 20B are indeed being sold, their RFID tags can be switched to be in a different behavior state for additional consumer privacy according to embodiments.

FIG. 20C illustrates how goods with tags 2061, 2062, 2063 are being purchased by a consumer (not shown). The goods have been brought to sales counter 2022, and their tags 2061, 2062, 2063 are being read by RFID reader 2024. With RFID tags, checkout can be faster, and often more accurate as well.

In FIG. 20C, reader 2024 sends privatize commands 2020. Accordingly each of tags 2061, 2062, 2063 transitions from behavior state 2010 to behavior state 2080. Their individual tag memories can now become as shown by designation 1881 of FIG. 18. This memory remapping can increase consumer privacy, protect sensitive retailer information, or both, as per the above.

Figure 20D:
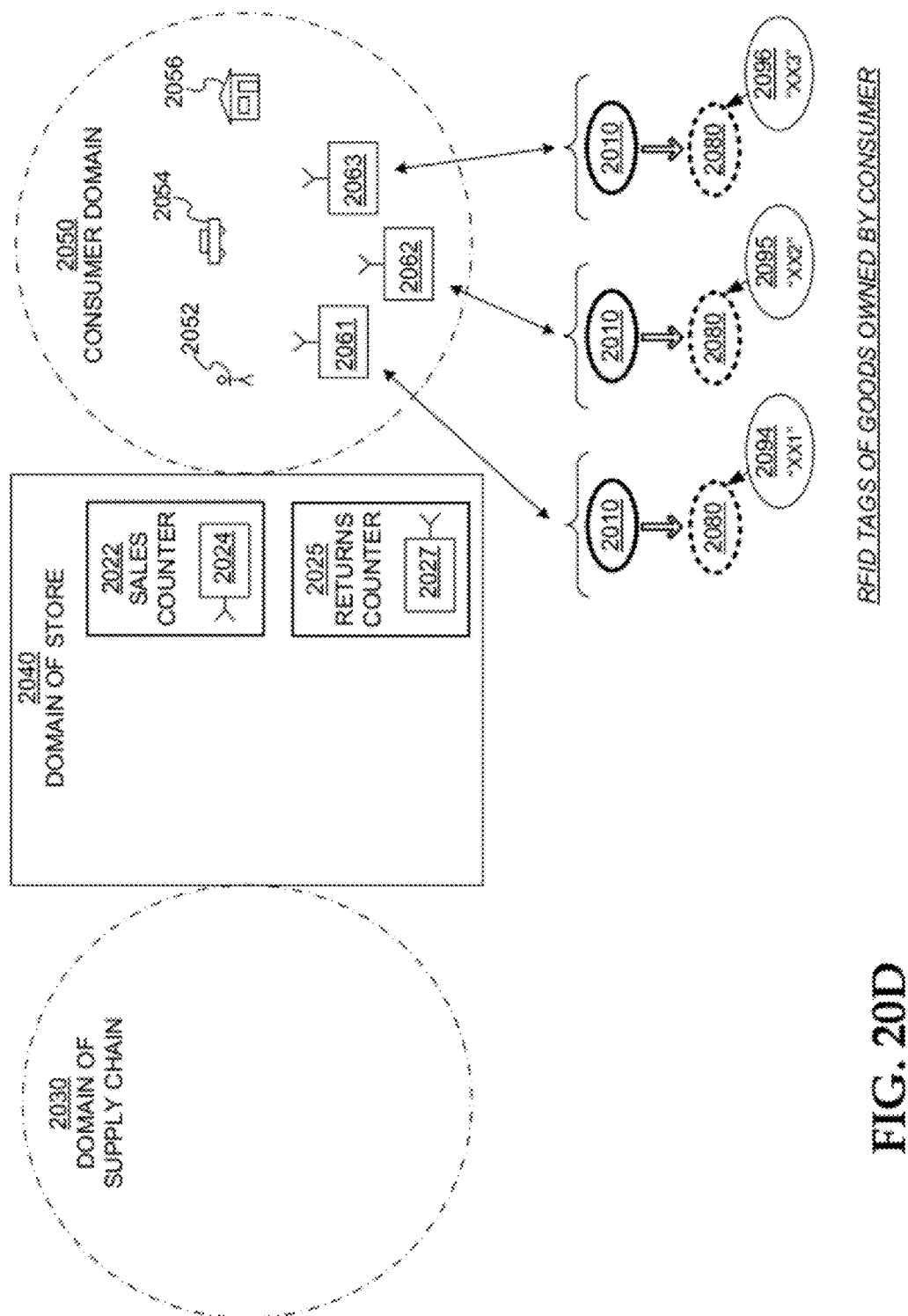
FIG. 20D is a diagram illustrating how, when the sold goods of FIG. 20C are in the possession of consumers, their RFID tags are in the different behavior state with additional consumer privacy according to embodiments.

FIG. 20D illustrates how goods with tags 2061, 2062, 2063, after the sale in FIG. 20C, are in consumer domain 2050. A consumer 2052 can carry the goods on their person 2052, in their car 2054, and take them to their residence 2056. During this time, tags 2061, 2062, 2063 are in the obscured/privacy behavior state 2080, having transitioned to it as shown in FIG. 20C. This means that, if interrogated by a reader, tags 2061, 2062, 2063 might not respond at all, or might respond with limited or scrambled information, depending on the exact implementation of the obscured/privacy behavior state. They might respond only with EPC and sale information 1872 from FIG. 18 at long range, and with more detailed information at short range. The variety of options according to the present embodiments is designated simplistically by tag 2061 responding with a code 2094 for a reading of "XX1", tag 2062 responding with a code 2095 for a reading of "XX2", and tag 2063 responding with a code 2096 for a reading of "XX3".

Figure 21:
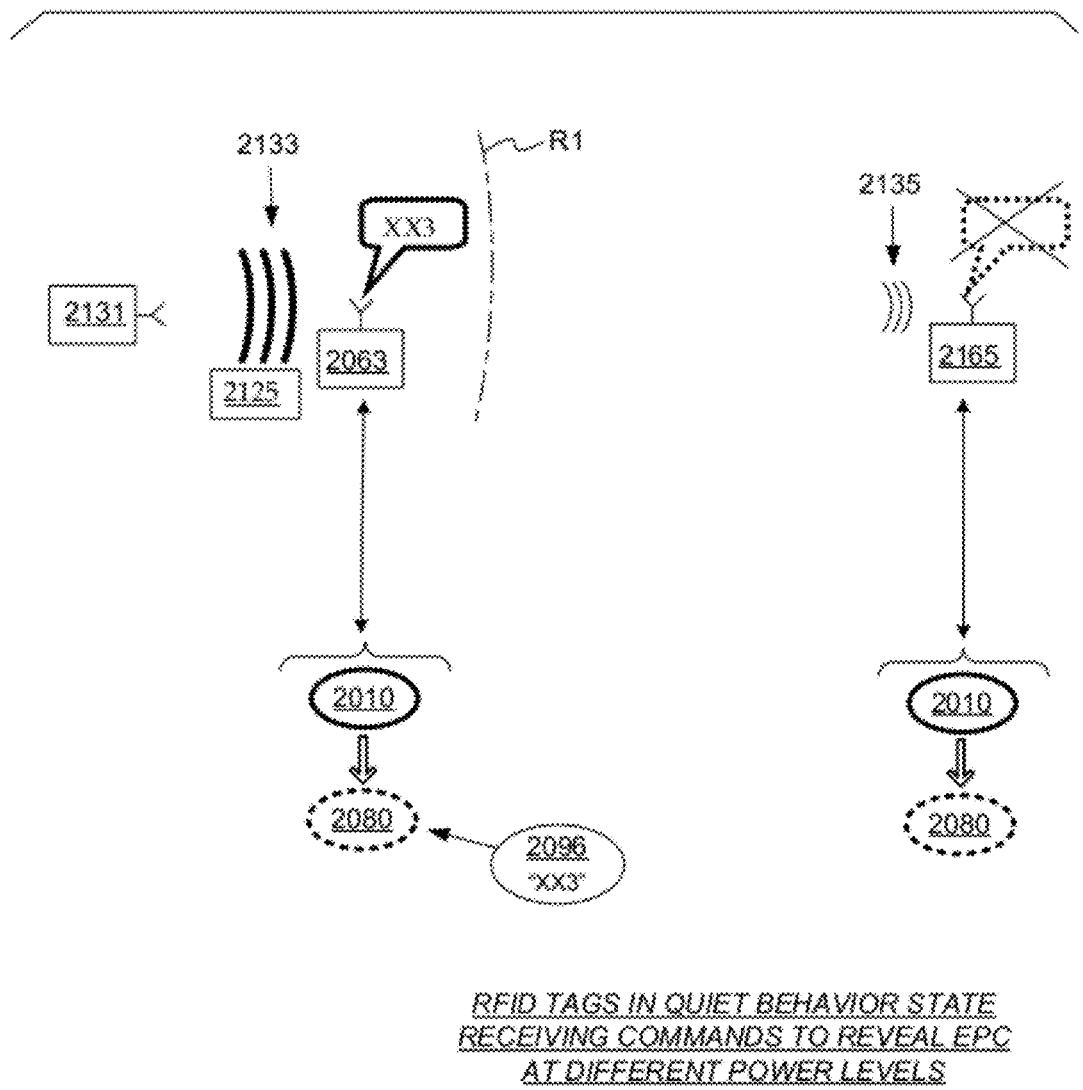
FIG. 21 is a diagram for illustrating how privacy can be increased by the invention, for the scenario of FIG. 20D.

These readings "XX1", "XX2", "XX3" can be harder to decode than the respective readings of "bread", "milk", and "cereal" respectively. For example, readings "XX1", "XX2", "XX3" can correspond to the sale information in field 1857 in FIG. 18. The sale information can be unprotected, but it is still less revealing than the item information. Moreover, this sale information, or other information, can be encrypted by the store, and thus even harder to decode. In other embodiments, the readings can be all identical, further confounding any unauthorized efforts to read them. An example is shown in FIG. 21, later in this document.

Not shown in FIG. 20D are possible readers located at the store exits, which in embodiments can read the "XX1", "XX2", and "XX3" to determine the legitimacy of a sale without necessarily knowing that "XX1" corresponds to bread, "XX2" to milk, and "XX3" to cereal. In fact, an exit reader seeing a code that starts with XX might be configured to not sound an alarm, whereas the same reader seeing an un-remapped code "bread" might sound an alarm indicating that the item was being stolen. A person with ordinary skill in the art will recognize that the present invention and the embodiments described herein can implement the functions of Electronic Article Surveillance (EAS) by appropriate use or absence of the sale information 1857 in designation 1881 of FIG. 18, for items passing through a store exit.

Figure 20E:
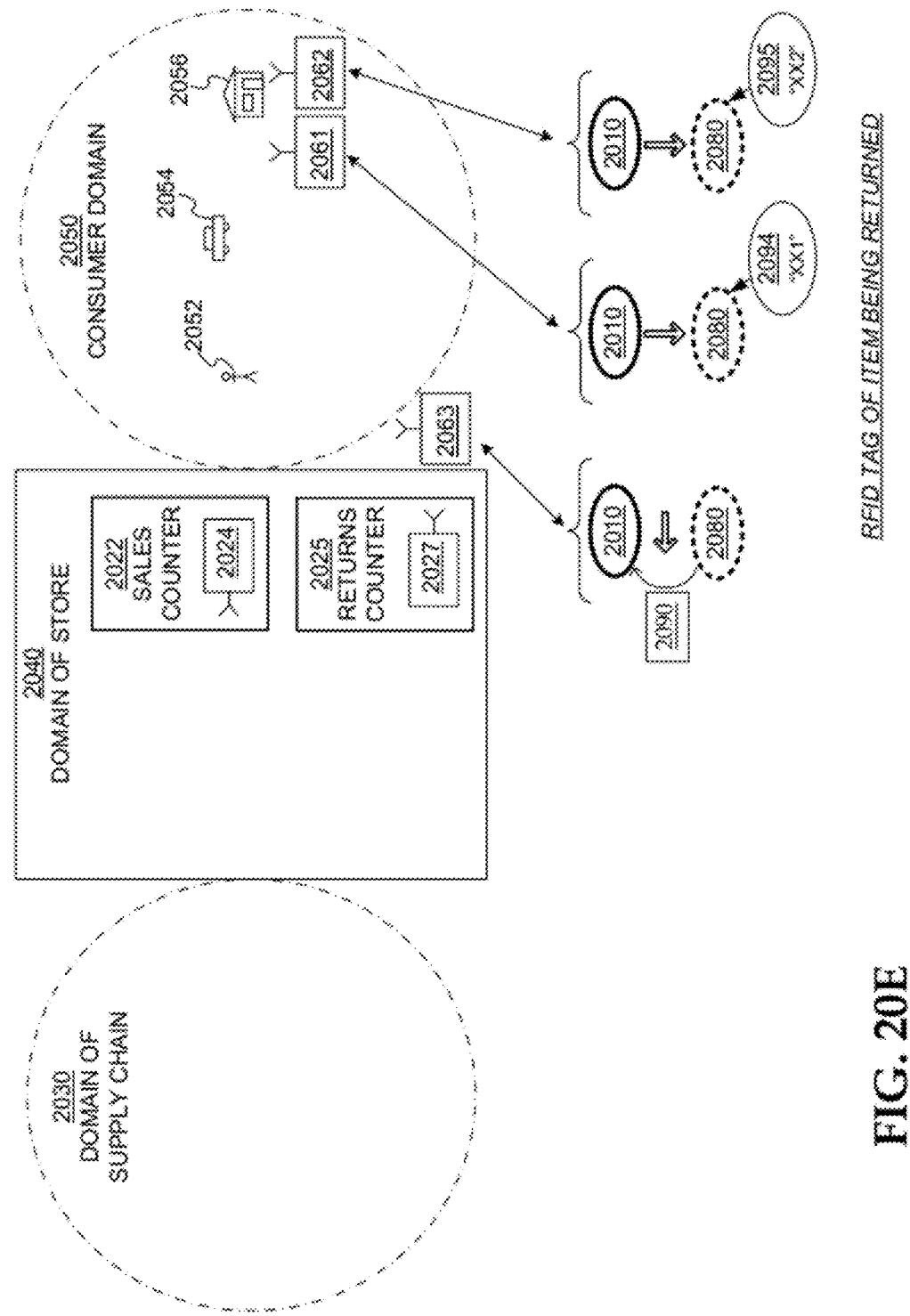
FIG. 20E is a diagram illustrating how, when an item of FIG. 20D is being returned to the store, its RFID tag can be switched to be in a yet different behavior state according to embodiments, such as the easily readable state of FIG. 20B.

FIG. 20E illustrates how one item purchased earlier is now being returned to the store. The item is brought to the returns counter 2025, and its RFID tag 2063 is read by RFID reader 2027. Reader 2027 is authorized for this reading. It might first receive the reading "XX3", as per the above. In any event, reader 2027 issues a publicize command 2090. This causes RFID tag 2063 to transition back to the easily readable behavior state 2010. Then the full tag can be read again, as in FIG. 20C, and the consumer can be given their refund.

Figure 20F:
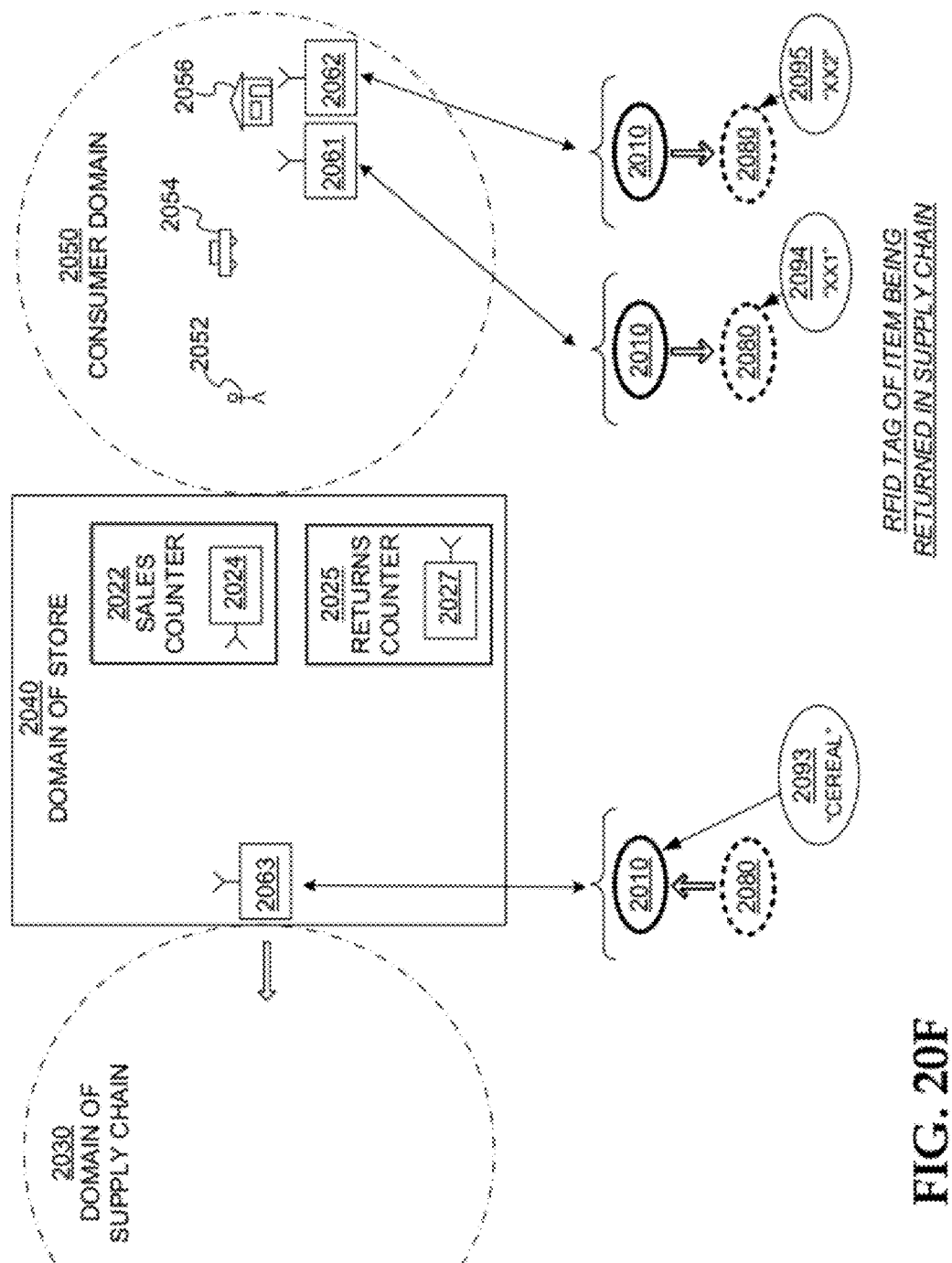
FIG. 20F is a diagram illustrating how, when the returned item of FIG. 20E is being returned through the supply chain, its RFID tag can be in an easily readable state, such as that of FIG. 20B or FIG. 20A.

FIG. 20F illustrates the returned item of FIG. 20E available for sale to another consumer. Tag 2063 is in the easily readable behavior state 2010. If interrogated, it would respond again with code 2093 for "cereal". Its tag memory can be as shown by designation 1812 of FIG. 18.

As was mentioned above, restrictions can be optionally placed in certain of the operations of the invention for additional security. Some such restrictions are to require higher power for some of the more sensitive operations. Two more examples are now described.

FIG. 21 illustrates a scenario where an unauthorized reader 2131 might be used to surreptitiously read RFID tags. This is the scenario of protecting consumer privacy, such as shown in FIG. 20D when the tags are in the consumer domain. Reader 2131 might try to read tag 2063 that is close, within a radius R1, and tag 2165 that is farther away, outside radius R1. Accordingly, reader 2131 transmits a command 2125 that is encoded in an RF wave.

Tag 2063 perceives the wave as having a large intensity 2133, because the reader is close, within a radius R1. Accordingly, depending on embodiments, tag 2063 may respond with obscured reading "XX3", or with "bread", because a nearby reader close to the consumer is presumed to be legitimate.

Tag 2165 perceives the wave as having a low intensity 2135, because the reader is far, outside radius R1. While tag 2165 is capable of responding, depending on embodiments, it may not do so, or it may respond with an obscured reading, because it is in its obscured/privacy state.

Figure 22:
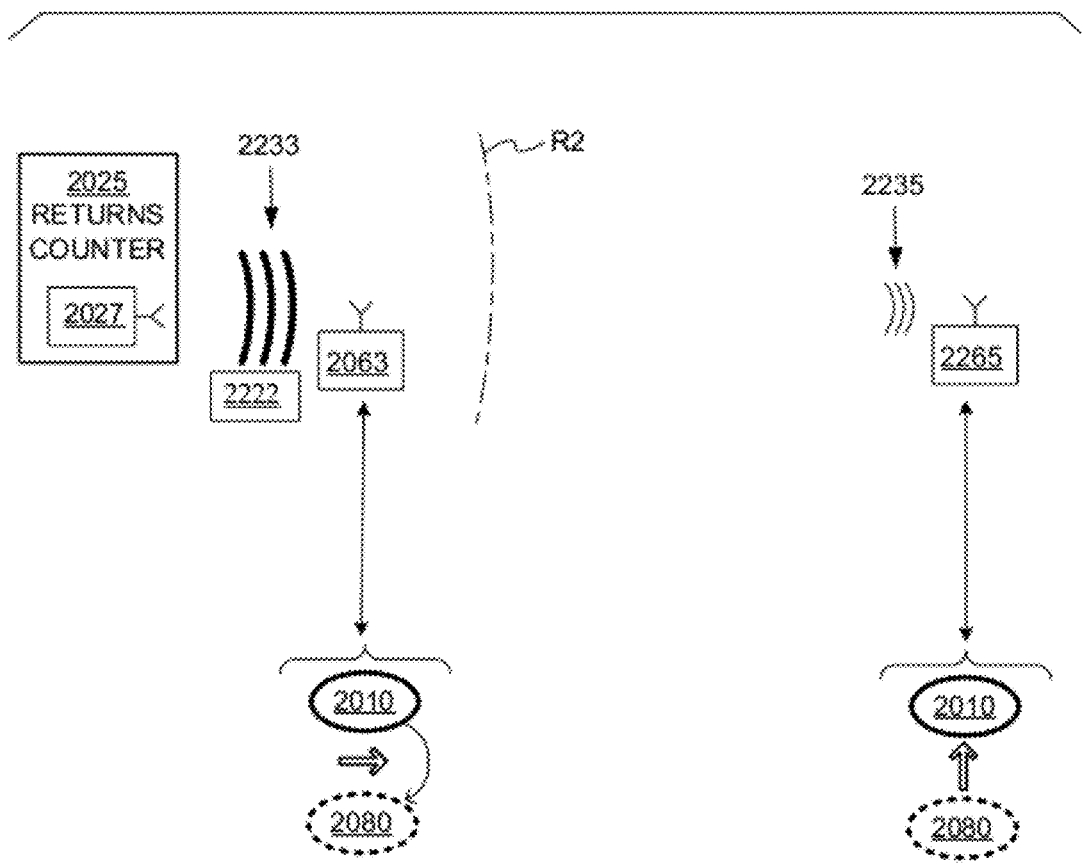
FIG. 22 is a diagram for illustrating additional safeguards in changing the behavior of a tag, such as in FIG. 20E, according to embodiments.

FIG. 22 illustrates a scenario where a behavior change command is being issued. This is what can take place at a returns counter 2025 of FIG. 20E, or a sales counter 2022 of FIG. 20C. Reader 2027 will issue a command 2222, which can reach tags 2063 and 2265. Command 2222 is encoded in an RF wave.

Tag 2063 perceives the wave as having a large intensity 2233, because the reader is close, within a radius R2. Accordingly, tag 2063 switches its behavior state.

Tag 2265 perceives the wave as having a low intensity 2235, because the reader is far, outside radius R2. While tag 2265 is capable of switching its behavior state, it does not do so, thereby preventing tag 2265 from exposing its sensitive or hidden information. As described previously, tag 2265, detecting the low intensity wave 2235, could simply choose not to implement the behavior change command, or it could choose not to enter the internal protocol state where the behavior change command is allowed and thereby prevent implementing the behavior change command. Reader 2027 would have to be brought closer, where the consumer could presumably clearly see it, in order for tag 2265 to receive wave 2222 with sufficient intensity for tag 2265 to change its behavior state.

It will be recognized that the invention permits storing information in a tag such that this information is readable only when the tag is in certain behavior states. Sensitive information can thus be stored, such as warranty information or passwords, while at the same time other information can be exposed in place of the sensitive information. Storing can be in different places of the memory, so as to be very hard for an unauthorized person to read. A tag can travel, for example through a portion of the supply chain, while not revealing the sensitive information. There are a number of such entities that can use this feature. For example, a legitimate manufacturer may be concerned about their goods being counterfeited, or a tag manufacturer may be concerned about their tags being counterfeited, etc.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

What is claimed is:

1. An Integrated Circuit (IC) for use with a Radio Frequency Identification (RFID) tag having an antenna, comprising:
   a first set of memory bits for storing first data;
   a second set of memory bits for storing second data, the second set of memory bits not coinciding exactly with the first set; and
   a processing block operable to:
      receive via the antenna a first command which is according to a protocol, the protocol defining a plurality of distinct called-for protocol states for the tag, the protocol requiring the tag to send in response to the first command a specific code if the processing block is in an internal tag protocol state that is compatible with a certain one of the called-for protocol states, the first command received at sufficient power for the tag to respond with the specific code;
      map one of the first and the second set of memory bits for purposes of responding to the first command; and
      send, if the processing block is in the compatible internal tag protocol state, in conformance with the protocol, a reply code as the specific code in response to the first command, the reply code being a first code that is derived at least in part from the first data if the processing block maps the first set of memory bits, the reply code alternatively being a second code distinct from the first code, the second code derived at least in part from the second data if the processing block maps the second set of memory bits.

2. The IC of claim 1, further comprising:
a third set of memory bits for storing third data, the third set distinct from the first set and from the second set, and
in which the processing block is further operable to:
  transition to mapping the third set of memory bits instead of the first or the second set of memory bits such that, if the processing block were to receive via the antenna the first command while in the compatible internal tag protocol state, it would cause the tag to send in response a third code derived at least in part from the third data.

3. The IC of claim 1, further comprising:
a behavior indicator capable of indicating which of the first set and the second set of memory bits the processing block maps.

4. The IC of claim 3, in which
the behavior indicator is encoded in one or more values stored in respective one or more memory cells of the IC.

5. The IC of claim 4, in which
it is determined whether the processing block maps the first set of memory bits or alternatively the second set of memory bits by a logical address being used together with the one or more values encoding the behavior indicator.

6. The IC of claim 1, in which
when the processing block maps the first set of memory bits, the reply code is not sent unless the first command has been received at a power level higher than a first level, and
when the processing block maps the second set of memory bits, the reply code is not sent unless the first command has been received at a power level higher than a second level which is different from the first level.

7. The IC of claim 1, in which
the processing block is capable of being in one of at least two distinct internal tag protocol states, each of which is a version compatible with a single called-for protocol state,
the processing block maps the first set of memory bits for purposes of responding to the first command when it is in a first one of the two internal tag protocol states, and
the processing block maps the second set of memory bits for purposes of responding to the first command when it is in a second one of the two internal tag protocol states.

8. The IC of claim 1, in which the processing block is further operable to
transition from mapping the first set of memory bits to mapping the second set of memory bits.

9. The IC of claim 8, in which
after transitioning, the processing block can no longer map the first set of memory bits.

10. The IC of claim 8, in which
after transitioning, the processing block is further operable to transition back to mapping the first set of memory bits instead of the second set of memory bits, such that, if the processing block were to receive via the antenna the first command while in the compatible internal tag protocol state, it would cause the tag to send in response the first code.

11. The IC of claim 8, in which
transitioning is performed in response to the processing block gaining power after having lost power.

12. The IC of claim 8, further comprising:
a counter operable to count responsive to events, and
in which transitioning is performed in response to the counter having counted to a limit.

13. The IC of claim 8, further comprising:
a volatile memory cell that can store a value temporarily and then discontinue storing the value, and
in which transitioning is performed in response to the volatile memory cell discontinuing storing the value while the processing block is powered.

14. The IC of claim 8, in which
transitioning is performed in response to the processing block receiving a behavior change command distinct from the first command.

15. The IC of claim 14, in which
when the processing block maps the first set of memory bits, the reply code is not sent unless the first command has been received at a power level higher than a first level, and
transitioning is performed only if the behavior change command is received at a power level higher than a second level which is different from the first level.

16. The IC of claim 15, further comprising:
a behavior indicator capable of indicating which of the first set and the second set the processing block maps, and
in which the behavior indicator changes which of the first set and the second set it indicates in response to the behavior change command being received.

17. The IC of claim 16, in which
the behavior indicator is encoded in one or more values stored in respective one or more memory cells of the IC, and
the behavior change command causes the behavior indicator to be changed by rewriting the one or more values.

18. The IC of claim 14, in which
a password is stored in the IC, and
transitioning is performed only if the behavior change command meets a preset condition about the password.

19. The IC of claim 18, in which
the password is a tag access password equivalent to the access password specified in the Gen2 Spec v.1.1.0.

20. The IC of claim 14, in which
the processing block is capable of being in an internal tag protocol state belonging in one of a first subset and a second subset, and
transitioning can be performed if the processing block is in one of the internal tag protocol states of the second subset but not of the first subset.

21. The IC of claim 20, in which
when the processing block maps the first set of memory bits, the reply code is not sent unless the first command has been received at a power level higher than a first level, and
the processing block is capable of entering one of the internal tag protocol states in the second subset if power is received at a second level which is higher than the first level.

22. The IC of claim 20, in which
a password is stored in the IC, and
the processing block is capable of entering one of the internal tag protocol states in the second subset if the behavior change command meets a preset condition about the password.

23. A Radio Frequency Identification (RFID) tag, comprising: an antenna; and a circuit coupled to the antenna, the circuit comprising:
a first set of memory bits for storing first data;
a second set of memory bits for storing second data, the second set of memory bits not coinciding exactly with the first set; and
a processing block operable to:

receive via the antenna a first command which is according to a protocol, the protocol defining a plurality of distinct called-for protocol states for the tag, the protocol requiring the tag to send in response to the first command a specific code if the processing block is in an internal tag protocol state that is compatible with a certain one of the called-for protocol states, the first command received at sufficient power for the tag to respond with the specific code;

map one of the first and the second set of memory bits for purposes of responding to the first command; and send, if the processing block is in the compatible internal tag protocol state, in conformance with the protocol, a reply code as the specific code in response to the first command, the reply code being a first code that is derived at least in part from the first data if the processing block maps the first set of memory bits, the reply code alternatively being a second code distinct from the first code, the second code derived at least in part from the second data if the processing block maps the second set of memory bits.

24. The tag of claim 23, in which when the processing block maps the first set of memory bits, the reply code is not sent unless the first command has been received at a power level higher than a first level, and when the processing block maps the second set of memory bits, the reply code is not sent unless the first command has been received at a power level higher than a second level which is different from the first level.

25. The tag of claim 23, in which the processing block is further operable to transition from mapping the first set of memory bits to mapping the second set of memory bits.

26. The tag of claim 25, in which transitioning is performed in response to the processing block gaining power after having lost power.

27. The tag of claim 25, further comprising:

a volatile memory cell that can store a value temporarily and then discontinue storing the value, and in which transitioning is performed in response to the volatile memory cell discontinuing storing the value while the processing block is powered.

28. The tag of claim 25, in which transitioning is performed in response to the processing block receiving a behavior change command distinct from the first command.

29. The tag of claim 28, further comprising:

a behavior indicator capable of indicating which of the first set and the second set the processing block maps, and in which the behavior indicator changes which of the first set and the second set it indicates in response to the behavior change command being received.

30. The tag of claim 28, in which a password is stored in the IC, and transitioning is performed only if the behavior change command meets a preset condition about the password.

31. A method for a Radio Frequency Identification (RFID) tag that includes an antenna, a first set of memory bits for storing first data, a second set of memory bits for storing second data, the second set of memory bits not coinciding exactly with the first set, and a processing block, the method comprising:

receiving via the antenna a first command which is according to a protocol, the protocol defining a plurality of distinct called-for protocol states for the tag, the protocol requiring the tag to send in response to the first command a specific code if the processing block is in an internal tag protocol state that is compatible with a certain one of the called-for protocol states, the first command received at sufficient power for the tag to respond with the specific code;

mapping one of the first and the second set of memory bits for purposes of responding to the first command; and sending, if the processing block is in the compatible internal tag protocol state, in conformance with the protocol, a reply code as the specific code in response to the first command, the reply code being a first code that is derived at least in part from the first data if the processing block maps the first set of memory bits, the reply code alternatively being a second code distinct from the first code, the second code derived at least in part from the second data if the processing block maps the second set of memory bits.

32. The method of claim 31, in which when the processing block maps the first set of memory bits, the reply code is not sent unless the first command has been received at a power level higher than a first level, and when the processing block maps the second set of memory bits, the reply code is not sent unless the first command has been received at a power level higher than a second level which is different from the first level.

33. The method of claim 31, further comprising:

transitioning from mapping the first set of memory bits to mapping the second set of memory bits.

34. The method of claim 33, in which transitioning is performed in response to the processing block gaining power after having lost power.

35. The method of claim 33, in which transitioning is performed in response to the processing block receiving a behavior change command distinct from the first command.

36. The method of claim 35, in which a behavior indicator is capable of indicating which of the first set and the second set the processing block maps, and the behavior indicator changes which of the first set and the second set it indicates in response to the behavior change command being received.

37. The method of claim 35, in which a password is stored in the IC, and transitioning is performed only if the behavior change command meets a preset condition about the password.

* * * * *

UNITED STATES PATENT AND TRADEMARK OFFICE
CERTIFICATE OF CORRECTION

PATENT NO. : 8,228,175 B1
APPLICATION NO. : 12/404934
DATED : July 24, 2012
INVENTOR(S) : Diorio et al.

Page 1 of 1

It is certified that error appears in the above-identified patent and that said Letters Patent is hereby corrected as shown below:

1) Please delete "block Gen2 544" in column 8, line 39 and insert -- block 544 --, therefor.

Signed and Sealed this
Nineteenth Day of February, 2013

Teresa Stanek Rea
*Acting Director of the United States Patent and Trademark Office*